(12) United States Patent
Low et al.

(10) Patent No.: US 10,958,166 B1
(45) Date of Patent: Mar. 23, 2021

(54) STARTUP OF SWITCHED CAPACITOR STEP-DOWN POWER CONVERTER

(71) Applicant: pSemi Corporation, San Diego, CA (US)

(72) Inventors: Aichen Low, Cambridge, MA (US); Walid Fouad Mohamed Aboueldahab, Wokingham (GB); Gregory Szczeszynski, Hollis, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/791,866

(22) Filed: Feb. 14, 2020

Related U.S. Application Data

(60) Provisional application No. 62/971,094, filed on Feb. 6, 2020.

(51) Int. Cl.
| | |
|---|---|
| *H02M 3/07* | (2006.01) |
| *G05F 3/26* | (2006.01) |
| *G05F 1/565* | (2006.01) |
| *H02M 1/00* | (2006.01) |

(52) U.S. Cl.
CPC ............ *H02M 3/073* (2013.01); *G05F 1/565* (2013.01); *G05F 3/262* (2013.01); *H02M 2001/0025* (2013.01); *H02M 2003/072* (2013.01)

(58) Field of Classification Search
CPC .............................. H02M 3/07; H02M 3/073
See application file for complete search history.

(56) References Cited

U.S. PATENT DOCUMENTS

| | | | |
|---|---|---|---|
| 10,263,514 B1 | 4/2019 | Aboueldahab | |
| 10,333,392 B2* | 6/2019 | Low | H02M 3/073 |
| 10,348,195 B2* | 7/2019 | Low | H02M 3/07 |
| 10,454,368 B2* | 10/2019 | Low | H02M 3/07 |
| 10,686,367 B1* | 6/2020 | Low | H02M 3/158 |

OTHER PUBLICATIONS

Jaunay, et al., "DC-to-DC Design Guide", Viashy Siliconix, AN607, Document No. 71917, Oct. 2, 2010, pp. 1-23.
Kim, Jung H., Office Action received from the USPTO dated Nov. 18, 2020 for U.S. Appl. No. 16/807,753, 15 pgs.

* cited by examiner

*Primary Examiner* — Hai L Nguyen
(74) *Attorney, Agent, or Firm* — Jaquez Land Greenhaus LLP; John Land, Esq.

(57) ABSTRACT

Circuit embodiments for a switched-capacitor power converter, and/or methods of operation of such a converter, that robustly deal with various startup scenarios, are efficient and low cost, and have quick startup times to steady-state converter operation. Embodiments prevent full charge pump capacitor discharge during shutdown of a converter and/or rebalance charge pump capacitors during a startup period before switching operation by discharging and/or precharging the charge pump capacitors. Embodiments may include a dedicated rebalancer circuit that includes a voltage sensing circuit coupled to an output voltage of a converter, and a balance circuit configured to charge or discharge each charge pump capacitor towards a target steady-state multiple of the output voltage of the converter as a function of an output signal from the voltage sensing circuit indicative of the output voltage. Embodiments prevent or limit current in-rush to a converter during a startup state.

15 Claims, 21 Drawing Sheets

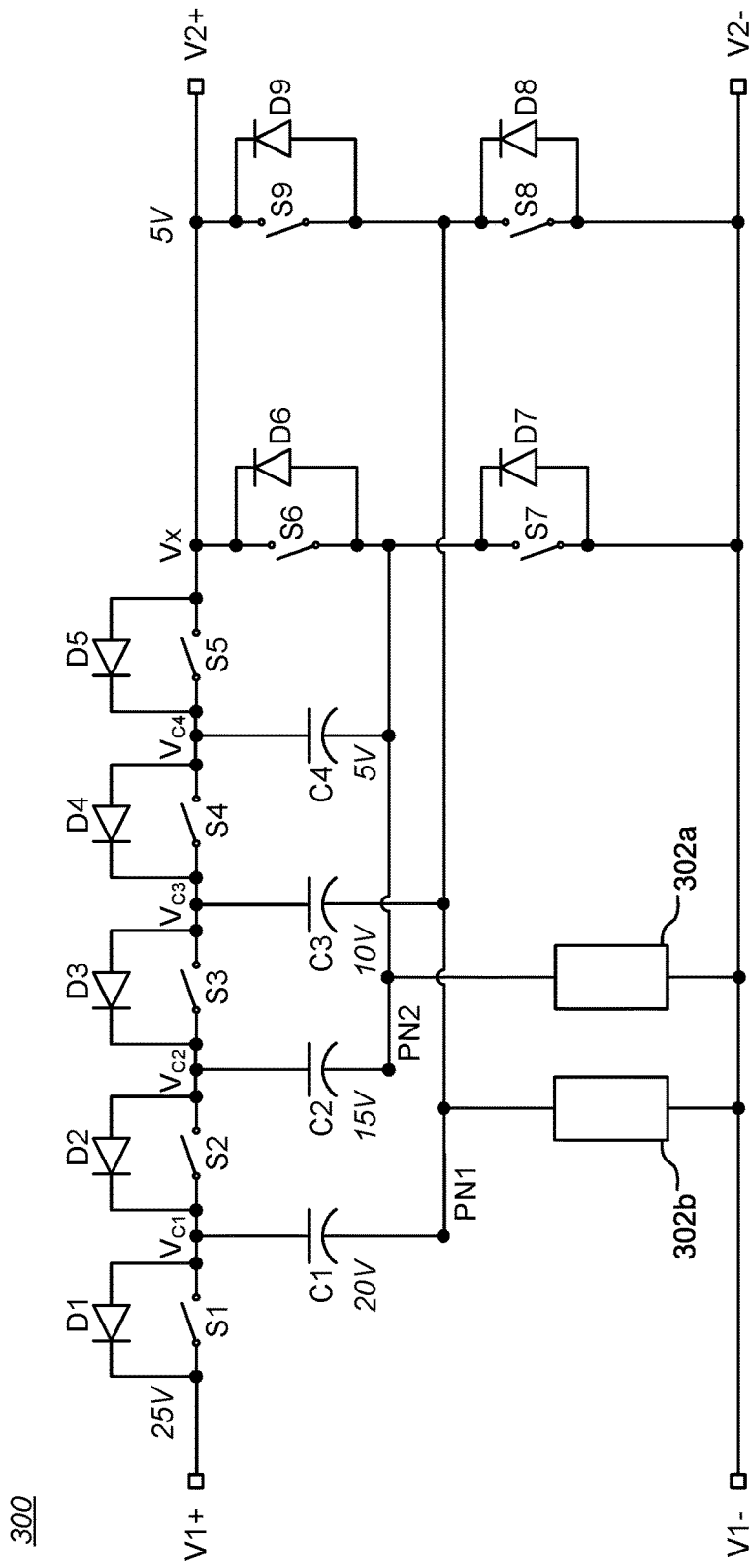
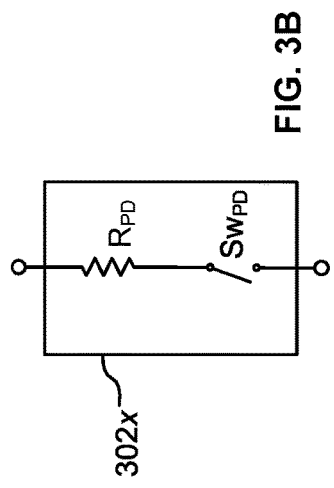
FIG. 3A
FIG. 3B

_1300_

```
During a shutdown state of a power converter
having a plurality of charge pump capacitors
and a plurality of low-side phase switches each
coupled to at least one respective charge pump
capacitor, keeping the plurality of low-side
phase switches closed
```
— 1302

```
In a power converter having a plurality of
charge pump capacitors and a plurality of low-
side phase switches each coupled to at least
one respective charge pump capacitor,
coupling a respective pulldown device in
parallel with one or more of the plurality of low-
side phase switches
```
— 1402

```
Configuring each pulldown device to prevent
full discharge of the charge pump capacitors
and/or to minimize in-rush current during at
least one selected state of the power converter
```
— 1404

> In a power converter having a plurality of charge pump capacitors, wherein each charge pump capacitor is connected between corresponding adjacent pairs of series-connected switches $S_x$, increasing the ON resistance $R_{ON}$ of the series-connected switches $S_x$ for a first selected duration of time and/or a first number of switching cycles and/or until a first measured voltage across any of the plurality of charge pump capacitors is within a corresponding desired value range — 1502

> In a power converter having a plurality of charge pump capacitors, wherein the power converter is configured to be coupled between a first voltage source and a second voltage source, in a startup mode of operation, disconnecting the second voltage source from the power converter and operating the power converter in a step-down mode of voltage conversion until the plurality of charge pump capacitors are charged to a desired voltage from the first voltage source — 1602

> Thereafter connecting the second voltage source to the power converter and enabling operation of the power converter in a step-down mode of voltage conversion — 1604

```
┌─────────────────────────────────────┐
│ In a power converter having a plurality of │
│ charge pump capacitors, wherein the power │
│ converter is configured to be coupled between │
│ a first voltage source and a second voltage │
│ source, in a startup mode of operation, │         ─ 1702
│ disconnecting the first voltage source from the │
│ power converter and operating the power │
│ converter in a reversed, step-up mode of │
│ voltage conversion until the plurality of charge │
│ pump capacitors are charged to a desired │
│ voltage from the second voltage source │
└─────────────────────────────────────┘
                    │
                    ▼
┌─────────────────────────────────────┐
│ Thereafter connecting the first voltage source to │
│ the power converter and enabling operation of │   ─ 1704
│ the power converter in a step-down mode of │
│ voltage conversion │
└─────────────────────────────────────┘
```

```
┌─────────────────────────────────────────────────┐
│ In a power converter, connecting pairs of charge pump │
│ capacitors between corresponding adjacent pairs of n series- │ ─── 1802
│ connected switches Sx, each series-connected switch Sx │
│ having a corresponding auxiliary switch/pathway SxA │
└─────────────────────────────────────────────────┘
```

- 1802: In a power converter, connecting pairs of charge pump capacitors between corresponding adjacent pairs of $n$ series-connected switches $S_x$, each series-connected switch $S_x$ having a corresponding auxiliary switch/pathway $S_xA$

- 1804: Coupling first and second high-side phase switches to at least one respective charge pump capacitor

- 1806: Coupling first and second low-side phase switches to at least one respective charge pump capacitor, each low-side phase switch having a corresponding auxiliary switch/pathway

- 1808: Limiting in-rush current to the plurality of charge pump capacitors by preventing full discharge of the charge pump capacitors during at least one selected state of the power converter by keeping the auxiliary switches/pathways of the first and second low-side phase switches closed during a first period of a time while opening the first and second high-side phase switches and the $n$ series-connected switches $S_x$ and corresponding auxiliary switches/pathways

- 1810: Balancing voltage among the plurality of charge pump capacitors after the first period of a time by closing the first and second low-side phase switches, optionally opening the auxiliary switches/pathways of the first and second low-side phase switches, keeping the first and second high-side phase switches open, keeping the $n$ series-connected switches $S_x$ open, closing the auxiliary switches/pathways of $m$ of the $n$ series-connected switches $S_x$ where $m$ is less than $n$, and then progressively opening one or more of the $m$ auxiliary switches/pathways of the $n$ series-connected switches $S_x$ over one or more time periods

In a power converter having a plurality of charge pump capacitors, wherein each charge pump capacitor is connected between corresponding adjacent pairs of series-connected switches Sx at a stack-node, sensing an output voltage of the power converter and generating a signal indicative of the output voltage — 1902

Charging or discharging each charge pump capacitor towards a corresponding multiple of the output voltage of the power converter as a function of the generated signal indicative of the output voltage — 1904

FIG. 19

STARTUP OF SWITCHED CAPACITOR STEP-DOWN POWER CONVERTER

CROSS-REFERENCE TO RELATED APPLICATIONS—CLAIM OF PRIORITY

The present application claims priority to U.S. provisional Patent Application No. 62/971,094, filed on Feb. 6, 2020, for a "Startup of Switched Capacitor Step-Down Power Converter", which is herein incorporated by reference in its entirety.

BACKGROUND

(1) Technical Field

(2) Background

Many electronic products, particularly mobile computing and/or communication products and components (e.g., notebook computers, ultra-book computers, tablet devices, LCD and LED displays) require multiple voltage levels. For example, radio frequency transmitter power amplifiers may require relatively high voltages (e.g., 12V or more), whereas logic circuitry may require a low voltage level (e.g., 1-2V). Still other circuitry may require an intermediate voltage level (e.g., 5-10V).

Power converters are often used to generate a lower or higher voltage from a common power source, such as a battery. One type of power converter comprises a converter circuit (e.g., a charge pump based on a switch-capacitor network), control circuitry, and, in some embodiments, auxiliary circuitry such as bias voltage generator(s), a clock generator, a voltage regulator, a voltage control circuit, etc. Power converters which generate a lower output voltage (e.g., $V_{OUT}$) level from a higher input voltage (e.g., $V_{IN}$) power source are commonly known as step-down or buck converters, so-called because $V_{OUT}<V_{IN}$, and hence the converter is "bucking" the input voltage. Power converters which generate a higher output voltage level from a lower input voltage power source are commonly known as step-up or boost converters, because $V_{OUT}>V_{IN}$. In many embodiments, a power converter may be bi-directional, being either a step-up or a step-down converter depending on how a power source is connected to the converter. As used in this disclosure, the term "charge pump" refers to a switched-capacitor network configured to boost or buck $V_{IN}$ to $V_{OUT}$. Examples of such charge pumps include cascade multiplier, Dickson, Ladder, Series-Parallel, Fibonacci, and Doubler switched-capacitor networks, all of which may be configured as a multi-phase or a single-phase network. As is known in the art, an AC-DC power converter can be built up from a DC-DC power converter by, for example, first rectifying an AC input to a DC voltage and then applying the DC voltage to a DC-DC power converter.

FIG. 1 is a block diagram of a prior art step-down power converter 100. In the illustrated example, the power converter 100 includes a generic converter circuit 102 and a controller 104. The converter circuit 102 may be, for example, a charge pump, and is configured to receive an input voltage $V_{IN}$ from a voltage source 106 at terminals V1+, V1−, and transform the input voltage $V_{IN}$ into a lower output voltage $V_{OUT}$ at terminals V2+, V2−. The output voltage $V_{OUT}$ may be coupled across an output capacitor $C_{OUT}$ and a load 108.

The controller 104 receives a set of input signals and produces a set of output signals. Some of these input signals arrive along an input-signal path 110. These input signals carry information that is indicative of the operational state of the converter circuit 102. The controller 104 also receives at least a clock signal CLK and may receive one or more external input/output signals I/O that may be analog, digital, or a combination of both. Based upon the received input signals, the controller 104 produces a set of control-signals 112 that control the internal components of the converter circuit 102 (e.g., internal switches, such as low voltage FETs, especially MOSFETs) to cause the converter circuit 102 to buck $V_{IN}$ to $V_{OUT}$. In some embodiments, an auxiliary circuit (not shown) may provide various signals to the controller 104 (and optionally directly to the converter circuit 102), such as the clock signal CLK, the input/output signals I/O, as well as various voltages, such as a general supply voltage $V_{DD}$ and a transistor bias voltage $V_{BIAS}$.

FIG. 2 is a schematic diagram of one embodiment of a converter circuit 200 comprising a single-phase symmetric cascade multiplier that may be used as an instance of the generic converter circuit 102 of FIG. 1. The converter circuit 200 is configured to receive an input voltage (e.g., $V_{IN}$, which is 25V in this example) at terminals V1+, V1−, and transform the input voltage into a lower output voltage (e.g., $V_{OUT}$, which is 5V in this example) at terminals V2+, V2−. The illustrated converter circuit 200 would be controlled by the controller 104 of FIG. 1 in known fashion.

A cascade multiplier is a switched-capacitor network that can provide a high conversion gain. As used in this disclosure, conversion gain represents (1) a voltage gain if the switched-capacitor network produces an output voltage that is larger than the input voltage ($V_{OUT}>V_{IN}$), or (2) a current gain if the switched-capacitor network produces an output voltage that is smaller than the input voltage ($V_{IN}>V_{OUT}$). Energy is transferred from the input to the output by cycling the cascade multiplier through different topological states. Charge is transferred from the input voltage to the output voltage via a charge transfer path. The number and configuration of the charge transfer capacitors in each topological state sets the conversion gain. The charge transfer capacitors are also commonly known as "fly capacitors" or "pump capacitors" and may be external components coupled to an integrated circuit embodiment of the converter circuit 200.

In the illustrated example, the converter circuit 200 includes five series-connected switches S1-S5. The switches may be, for example, MOSFET switches, and each switch S1-S5 may comprise a stack of series-connected MOSFETs having common gate connections and configured to function as a single switch. For convenience in discussing switching sequences, switches S1, S3, and S5 will sometimes be referred to collectively as the "odd switches" and switches S2 and S4 will sometimes be referred to collectively as the "even switches."

The converter circuit 200 also includes at least first and second "low-side" phase switches S7, S8 and first and second "high-side" phase switches S6, S9. In some charge pump embodiments, each pump capacitor Cx may be coupled to its own pair of phase switches (low-side plus high-side). There will still be mainly two switching states (as controlled by the P1-P2 clock waveforms described below) and accordingly some of these phase switches will switch in phase with others. The low-side phase switches S7, S8 can connect first and second phase-nodes PN1, PN2 to the V2− terminal. The V1− terminal is typically connected to and thus shares the same voltage as the V2− terminal; however, in some embodiments the V1− and V2− terminals may not be directly connected and thus may have different voltages. The high-side phase-switches S6, S9 can connect the first and second phase-nodes PN1, PN2 to the V2+ terminal. For convenience in discussing switching sequences, the high-side phase-switch S6 and the low-side phase-switch S8 will sometimes be referred to collectively as the "even phase-switches" and the low-side phase-switch S7 and the high-side phase-switch S9 will sometimes be referred collectively to as the "odd phase-switches."

The illustrated MOSFET embodiment assumes that the body and source terminals of each MOSFET transistor are connected together, in order to minimize ON resistance $R_{ON}$ and die area while maximizing power efficiency. When fabricated using a conventional silicon process technology, each MOSFET transistor has an inherent body-diode across its source and drain terminals. Thus, switches S1-S9 have respective inherent body-diodes D1-D9 as shown in FIG. 2. Because of the presence and polarity of the inherent body-diodes D1-D5, a forward electrical path exists from terminal V2+ to terminal V1+ even when all of the switches S1-S5 have been opened.

A clock source in the controller 104 generates non-overlapping clock waveforms P1 and P2 that are coupled to and control the ON/OFF state of the various switches S1-S9, generally through level shifter and gate-drive circuitry (not shown). In many embodiments, the illustrated converter circuit 200 would be paired with a near-identical circuit, differing only in that the component switches would be operated on opposite phases.

A first pump capacitor C1 connects a first stack-node $V_{C1}$ between switches S1 and S2 to phase-node PN1. Similarly, a third pump capacitor C3 connects a third stack-node $V_{C3}$ between switches S3 and S4 to phase-node PN1. A second pump capacitor C2 connects a second stack-node $V_{C2}$ between switches S2 and S3 to phase-node PN2. Similarly, a fourth pump capacitor C4 connects a fourth stack-node $V_{C4}$ between switches S4 and S5 to phase-node PN2. Typically, the voltage at each stack-node $V_{CX}$ and across terminals V1+, V1- and V2+, V2- would be monitored by a voltage measurement circuit (not shown, but typically included as part of the controller 104). A fifth stack-node, Vx, connects to terminal V2+ of the converter circuit 200 (the final output of the power converter is $V_{OUT}$).

The illustrated converter circuit 200 has four stages. The first stage includes switch S1, first stack-node $V_{C1}$, and first pump capacitor C1; the second stage includes switch S2, second stack-node $V_{C2}$, and second pump capacitor C2; the third stage includes switch S3, third stack-node $V_{C3}$, and third pump capacitor C3; and the fourth stage includes switch S4, fourth stack-node $V_{C4}$, and fourth pump capacitor C4. A fifth series switch S5 connects the fourth stage to the fifth stack-node, Vx, which connects to terminal V2+.

In response to receiving one or more input signals along an input-signal path 110, the controller 104 outputs a set of control-signals 112 to the converter circuit 200 (which, as noted above, is an instance of the generic converter circuit 102 in FIG. 1). These control signals cause the series switches S1-S5, the low-side phase-switches S7, S8, and the high-side phase-switches S6, S9 to change states according to a specific sequence. As a result, the converter circuit 200 repeatedly transitions between first and second operating states at a selected frequency.

For example, during a first operating state defined by the P1 clock waveform having a logic "1" state and the P2 clock waveform having a logic "0" state, the controller 104 (1) closes the odd switches S1, S3, S5, the low-side phase switch S7, and the high-side phase switch S9, and (2) opens the even switches S2, S4, the high-side phase switch S6, and the low-side phase switch S8. During a second operating state defined by the P2 clock waveform having a logic "1" state and the P1 clock waveform having a logic "0" state, the controller 104 (1) opens the odd switches S1, S3, S5, the low-side phase switch S7, and the high-side phase switch S9, and (2) closes the even switches S2, S4, the high-side phase switch S6, and the low-side phase switch S8. The controller 104 controls and sequences transitions of all the switches S1-S9 in such a way as to incorporate any necessary dead-time needed when transitioning between the first and second operating states. As a consequence of alternating between the first operating state and the second operating state, charge is divided and conveyed from terminals V1+, V1- to terminals V2+, V2-, in known fashion.

The maximum conversion gain for the illustrated embodiment is five because there are four stages. This means the input voltage received by converter circuit 200 across terminals V1+, V1- is five times higher than the output voltage produced across terminals V2+, V2-. Thus, for example, if 25V is applied across terminals V1+, V1-, the voltage across the capacitors C1-C4 will progressively decrease to 20V, 15V, 10V, and 5V, respectively, such that the voltage across terminals V2+, V2- will be 5V.

Step-down switched-capacitor power converters such as illustrated in FIG. 1 present a number of design challenges. One challenge is that such a power converter must be able to start up from a variety of conditions in a robust manner. These conditions vary depending on the initial voltage at the capacitor $C_{OUT}$ relative to the voltages at each of the charge pump capacitors (e.g., C1-C4 in the example of FIG. 2). Depending on such voltages, the converter circuit nodes may be subject to over-voltage or under-voltage conditions, switch stress, and/or excessive in-rush current. For example, the capacitor $C_{OUT}$ generally has a capacitance much greater than either the individual capacitances or the collective capacitance $C_{PUMP}$ of the charge pump capacitors Cx (e.g., capacitors C1-C4 in FIG. 2). Sufficiently large imbalances of the voltage between $C_{OUT}$ and each of the charge pump capacitors Cx can lead to over-voltage or under-voltage scenarios that stress the switches and/or lead to excessive in-rush current when charge pump switching begins. Some of these challenges may also apply to step-up switched-capacitor power converters.

The present invention is directed at circuits and methods that meet these challenges and provide power converters based on switched-capacitor networks that are efficient, low-cost, robust, and high performance.

SUMMARY

The invention encompasses a number of circuit embodiments for a step-down switched-capacitor power converter, and/or methods of operation of such a converter, that robustly deal with all startup scenarios (including intermediate states), are efficient and low cost, and have reasonably quick startup times to steady-state power converter operation.

One aspect of the invention encompasses power converter embodiments that avoid or mitigate in-rush current by preventing or limiting full discharge of the pump capacitors Cx while a converter circuit is disabled or in a shutdown state. One method of preventing a full or total discharge of the pump capacitors Cx is to keep at least the "low-side" phase switches closed (ON) during at least the shutdown state so that the phase nodes that couple to the bottom terminals of the pump capacitors Cx are pulled down towards circuit ground. In alternative embodiments, pull-down devices are coupled in parallel with respective low-side phase switches and passively or actively operate to pull down the phase nodes towards circuit ground.

Another aspect of the invention encompasses embodiments that rebalance charge pump capacitors during a pre-switching period of the startup state in order to prevent over-voltage or under-voltage conditions, switch stress, and/or excessive in-rush current. Rebalancing involves setting the voltage across each of the charge pump capacitors Cx to approximate target multiples of the voltage $V_{OUT}$ at the charge pump output terminal by discharging and/or pre-charging the charge pump capacitors, either simultaneously or sequentially, before the start of charge pump switching operation. Some of the rebalancing embodiments involve dedicated circuitry, while other rebalancing embodiments involve only slight circuit modifications and/or modifications of clock timing sequences applied to the charge pump switches Sx.

Other embodiments avoid such an intermediate rebalancing step by reducing the rate of charge transfer at startup of a switched-capacitor power converter, or by selectively isolating the charge pump from the output capacitor $C_{OUT}$ for some duration at startup.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 3A is a schematic diagram of one embodiment of a step-down charge pump that may be used as a converter circuit in the power converter of FIG. 1, modified to prevent full charge pump capacitor discharge in a shutdown state and/or to minimize in-rush current from the output capacitor during startup.

FIG. 3B is a schematic diagram of a switched pulldown device comprising a transistor-based switch in series with a resistor that may be used as one or both of the pulldown devices of FIG. 3A.

FIG. 13 is a process flow chart showing a first method of preventing full charge pump capacitor discharge during a shutdown state of a switched-capacitor power converter having a plurality of charge pump capacitors and a plurality of low-side phase switches each coupled to at least one respective charge pump capacitor.

FIG. 14 is a process flow chart showing a second method of preventing full charge pump capacitor discharge and/or to minimize in-rush current in a switched-capacitor power converter having a plurality of charge pump capacitors and a plurality of low-side phase switches each coupled to at least one respective charge pump capacitor.

FIG. 15 is a process flow chart showing a first startup method of limiting in-rush current and/or avoiding switch over-stress within a switched-capacitor power converter having a plurality of charge pump capacitors each connected between corresponding adjacent pairs of series-connected switches.

FIG. 16 is a process flow chart showing a second startup method of limiting in-rush current and/or avoiding switch over-stress within a switched-capacitor power converter, wherein the power converter is configured to be coupled between a first voltage and a second voltage.

FIG. 17 is a process flow chart showing a third startup method of limiting in-rush current and/or avoiding switch over-stress within a switched-capacitor power converter, wherein the power converter is configured to be coupled between a first voltage and a second voltage.

FIG. 18 is a process flow chart showing a first method of rebalancing a plurality of charge pump capacitors in a switched-capacitor step-down power converter.

FIG. 19 is a process flow chart showing a second method of rebalancing a plurality of charge pump capacitors in a switched-capacitor step-down power converter, wherein each charge pump capacitor is connected between corresponding adjacent pairs of series-connected switches at a stack-node.

Like reference numbers and designations in the various drawings indicate like elements.

DETAILED DESCRIPTION

Figure 1:
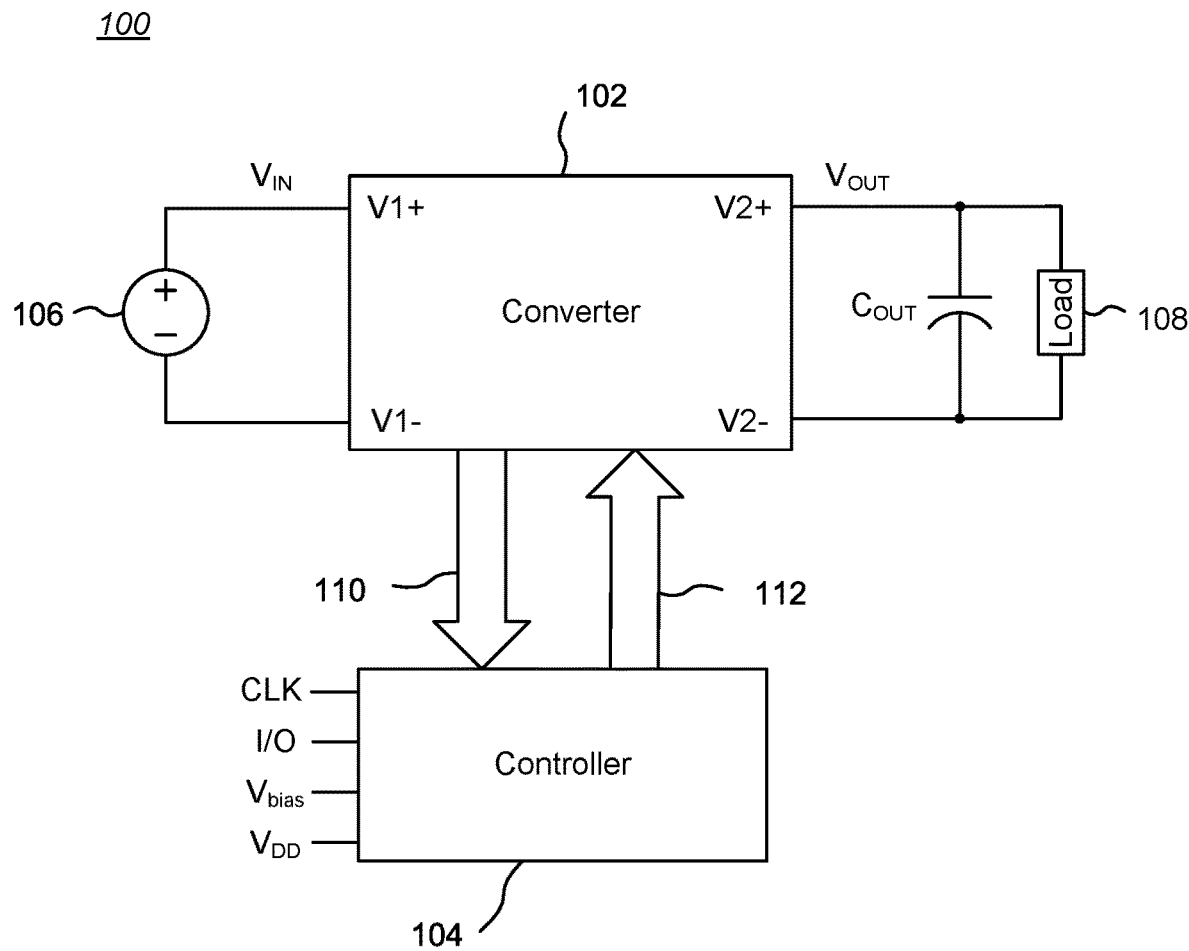
FIG. 1 is a block diagram of a prior art step-down power converter.

The present invention encompasses circuits and methods for reliable startup of switched-capacitor step-down power converters that robustly deal with all startup scenarios (including intermediate states), are efficient and low-cost, and have reasonably quick startup times to steady-state power converter operation.

Charge Pump States

In general, a switched-capacitor power converter or charge pump will operate in at least one of three distinct states: a steady-state, a shutdown state, and a startup state. During the steady-state or "normal" operation state, such a charge pump receives an input voltage $V_{IN}$ and transforms it, by switching connections to the pump capacitors Cx, into an output voltage $V_{OUT}$ that is a fraction of $V_{IN}$. In the shutdown state, there is no charge pump switching activity. In the startup state, a voltage difference is presented across the input terminals of the charge pump and circuit activity is enabled to eventually cause the charge pump to begin switching in order to transfer charge from the voltage source at the input to the output voltage using the pump capacitors Cx—that is, to transition from the shutdown state to steady-state operation. In some embodiments of the present invention, the startup state may include a pre-switching period in which some circuitry in the charge pump is active (e.g., to rebalance capacitor nodes) but charge pump switching is disabled (where charge pump switching is defined as applying clock waveforms P1 and P2 as generated by controller 104 to control the charge pump switches Sx), and a subsequent switching period in which charge pump switching commences but steady-state operation is not yet achieved.

However, the voltage across each pump capacitor Cx relative to each other as well as to the voltage across the output capacitor $C_{OUT}$ may be such that in the first few switching cycles, the charge pump switches Sx may experience voltage stress and/or the in-rush current at the charge pump input and output terminals may be excessive. Accordingly, during the startup phase it may be necessary to first rebalance the voltage on the pump capacitors with respect to the voltage on the output capacitor (noting the output capacitor may comprise multiple individual capacitors).

In particular, there is a problem of possible transient voltage stress across the charge pump switches Sx during start-up, when the pump capacitors Cx and the output capacitor $C_{OUT}$ are unbalanced relative to each other, meaning that they have non-zero voltages that deviate significantly from their steady-state values for particular $V_{IN}$ or $V_{OUT}$ values. Further, embodiments of switched-capacitor power converters may be subjected to a variety of capacitor charge states at startup resulting, for example, from startup of the power converter after a long shutdown duration and/or restart of the power converter after a fault condition (e.g., short circuit fault). For example, at startup of such a power converter after a long shutdown duration, none of the capacitors or capacitances $C_{OUT}$ or Cx may be initially precharged (Scenario 1). In other conditions prior to startup, the pump capacitors Cx (having a collective capacitance $C_{PUMP}$) may have no charge (e.g., due to leakage) while the much larger capacitance $C_{OUT}$ remains precharged (Scenario 2). In still other conditions, such as a startup after a short across the converter load, the pump capacitors Cx may be precharged but $C_{OUT}$ may have discharged (Scenario 3). Intermediate conditions may also occur where $C_{OUT}$ and/or the pump capacitors Cx are at varying precharged and/or discharged degrees. A good converter design should be able to deal with all of these startup conditions.

In Scenario 2 (precharged $C_{OUT}$, non-precharged Cx), terminal V2+ and the stack-nodes $V_{CX}$ may by subjected to an over-voltage when the low-side phase switches S7, S8 are first enabled and during initial switching cycles. In Scenario 3 (non-precharged $C_{OUT}$, pre-charged Cx), terminal V2+ and the stack-nodes $V_{CX}$ may also be subjected to an over-voltage in initial switching cycles when larger-voltage capacitors discharge into lower-voltage capacitors. Further, the ON resistance $R_{ON}$ of the FET-based switches may be as low as about 2 milliohms. With such low ON resistance in the charge pump switches, such startup conditions may result in damaging levels of current in-rush during initial switching cycles and over-voltage stress of the switches, particularly of FET (especially MOSFET) switches. In addition, FET-based switches generally need a gate drive circuit per switch, which may comprise at least a level shifter circuit and a transistor driver circuit. Large current in-rush and over-voltage stress may also readily damage the transistor driver circuit for one or more charge pump switches.

A simplistic solution to dealing with an unknown startup charge state for a switched-capacitor power converter would be to discharge all capacitors before startup commences so as to result in a known charge state, or to use high-voltage rated FETs for the charge pump switches so as to mitigate FET over-voltage stress. However, this solution is inefficient, wastes charge (which may be highly undesirable for battery-powered applications), and requires longer startup times to steady-state power converter operation. Furthermore, a particular application, such as a cellular phone, may not tolerate or allow a power converter component to discharge the output capacitor $C_{OUT}$ at its own whim.

A somewhat better solution is to utilize a precharge circuit to initially charge both the charge pump capacitors Cx and the output capacitor $C_{OUT}$ before startup. For example, if the pump capacitors C1-C4 in FIG. 2 and the output capacitor $C_{OUT}$ (FIG. 1) are pre-charged to the illustrated target voltage levels shown in FIG. 2 when an input voltage of 25 VDC is applied, then the maximum starting voltage across each of the switches S1-S5 would only be 5V, and thus more inefficient higher voltage switches are not required. However, such a solution may still be inefficient and still require longer startup times to normal steady-state power converter operation, especially since the output capacitor $C_{OUT}$ is usually far larger than the collective capacitance $C_{PUMP}$ of the pump capacitors and can require a longer time to precharge.

A more practical circuit embodiment of a switched-capacitor power converter and/or methods of operation of such a power converter should be able to robustly deal with all startup scenarios (including intermediate states), be efficient, low cost, and have quick startup times to steady-state converter operation. A number of solutions are presented below that may be used alone or in combination to achieve these desirable characteristics by preventing or minimizing in-rush current and/or avoiding switch over-stress. One solution category involves maintaining charge on pump capacitors or charging pump capacitors off of the output capacitor $C_{OUT}$ during the shutdown state and/or during a pre-switching period of the startup state. Another solution category is to rebalance charge or voltage on the pump capacitors during a pre-switching period of the startup state, or alternatively during a switching period of the startup state. Some of the rebalancing solutions involve dedicated circuitry, while other rebalancing solutions involve only slight circuit modifications and/or modifications of clock timing sequences applied to the charge pump switches Sx. Yet another solution category avoids rebalancing while achieving the same robustness goal by reducing the rate of charge transfer at startup. Still another solution category avoids rebalancing while achieving the same robustness goal by selectively isolating the charge pump input or output terminals during a pre-switching period of the startup state.

A. Prevention of in-Rush Current by Phase Node Pull-Down

One aspect of the invention encompasses embodiments that avoid or mitigate a sudden or uncontrolled in-rush current at startup by preventing or limiting a full discharge of the charge pump capacitors Cx during shutdown of a power converter. Shutdown may occur, for example, to conserve battery life of a hand-held electronic device such as a cellular telephone. Such embodiments address the issues of Scenario 2 (precharged $C_{OUT}$, non-precharged Cx), meaning that some voltage is available at terminal V2+ while there is little to no voltage across the pump capacitors Cx. Each of the circuits and methods described in this section alleviate the problems of startup over-voltage in Scenario 2 by preventing or limiting an in-rush of current from the output capacitor $C_{OUT}$ towards each pump capacitor Cx when switching begins. It is this in-rush of current that may cause over-voltage stress on the stack-nodes $V_{CX}$.

Figure 2:
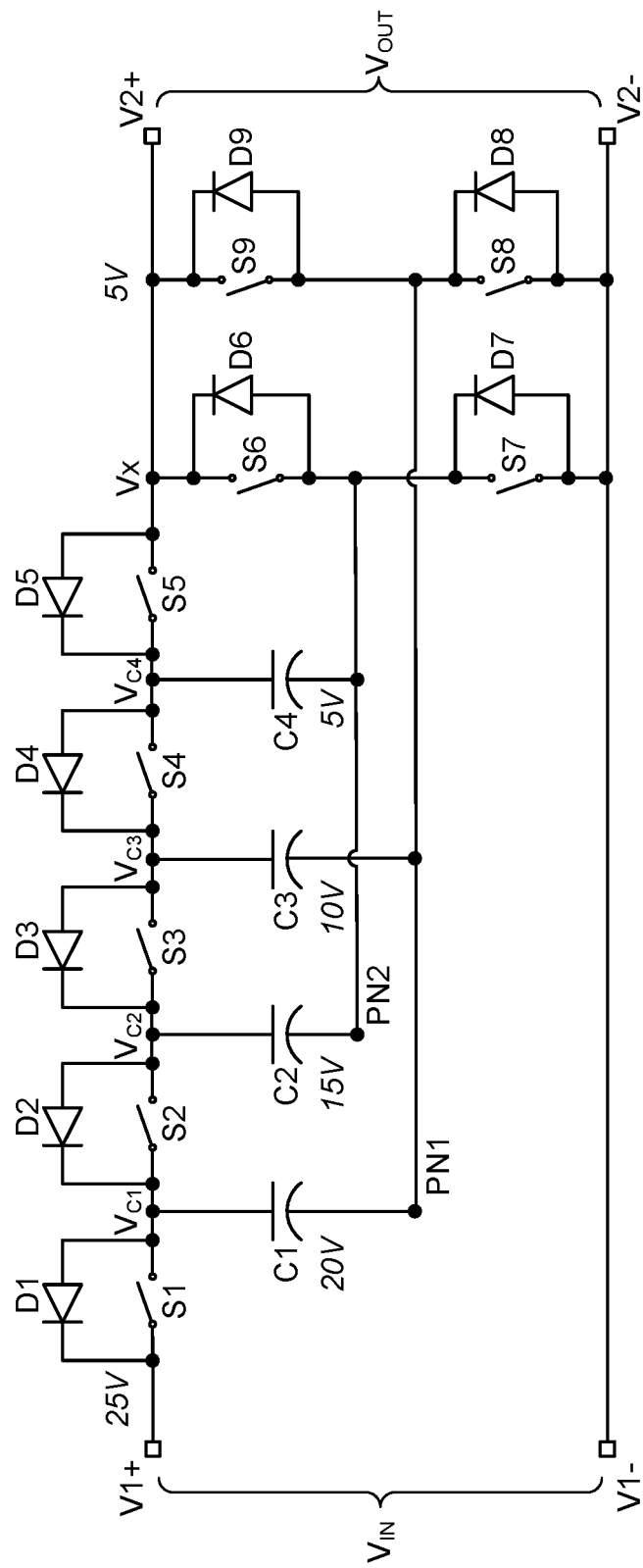
FIG. 2 is a schematic diagram of one embodiment of a converter circuit comprising a single-phase symmetric cascade multiplier that may be used as an instance of the generic converter circuit of FIG. 1.

In a conventional shutdown state for the example embodiment shown in FIG. 2, all of the switches S1-S9 are open (OFF). One method of preventing a full discharge of the pump capacitors Cx is to keep at least the "low-side" phase switches S7 and S8 closed (ON) during at least the shutdown state so that phase nodes PN1, PN2 are pulled down towards circuit ground (i.e., the potential at V2−). As a result, the charge pump capacitors Cx remain charged off of the voltage at terminal V2+(i.e., $V_{OUT}$) through the inherent body-diodes D2-D5. The state of switches S7 and S8 may be controlled by suitably programming or configuring the controller 104.

In some cases, it may not be feasible to keep switches S7 and S8 closed (ON) during the shutdown state, such as may be the case where the respective drivers for controlling the state of switches S7 and S8 are powered by a supply voltage that is not available in the shutdown state. Alternative embodiments cope with such a limitation. For example, FIG. 3A is a schematic diagram of one embodiment of a step-down charge pump 300 that may be used as a converter circuit 102 in the power converter 100 of FIG. 1, modified to prevent full charge pump capacitor discharge in a shutdown state and/or to minimize in-rush current from the output capacitor $C_{OUT}$ during startup. In the illustrated example, pulldown devices 302a, 302b are coupled in parallel with respective low-side phase switches S7, S8.

For example, the pulldown devices 302a, 302b may be simple resistors having resistive values small enough to support charging of capacitors C1-C4 while large enough to minimize power loss when phase nodes PN1, PN2 switch during post-startup steady-state operation. Such resistors may have fixed values, or be variable in value, or have a value set at the time of manufacture. Suitable resistive values for resistor-based pulldown devices 302a, 302b for many applications may be 100-200Ω. Since resistor-only pulldown devices 302a, 302b are always connected in the circuit, they are able to prevent charge pump capacitor discharge during the shutdown state without requiring any supply voltages.

In some applications, using only resistors for the pulldown devices 302a, 302b may hurt light-load efficiency due to the power loss when phase nodes PN1, PN2 are switched during steady-state operation. In alternative embodiments, the pulldown devices 302a, 302b may be transistor-based devices that are enabled (made fully or partially conductive) during a shutdown state and/or a pre-switching period of a startup state but which may be disabled (made essentially nonconductive) during steady-state operation so as to reduce or eliminate the impact of their presence on the charge pump 300. For example, the pulldown devices 302a, 302b may be resistive transistors (including MOSFETs), variable-resistance transistors (including MOSFETs), segmented transistors (including MOSFETs), transistor-based current sinks, etc. If a supply voltage is available during the shutdown state, the pulldown devices 302a, 302b may be enabled during the shutdown state and/or before charge pump switching is first enabled (i.e., during a pre-switching period of the startup state), but disengaged at other times, such as during steady-state operation. If a supply voltage is not available during the shutdown state, the pulldown devices 302a, 302b may be enabled during just the pre-switching period, but disengaged at other times, such as during steady-state operation.

In any case, when the pulldown devices 302a, 302b are engaged, they slowly (compared to low-side phase switches S7, S8) pull down the phase nodes PN1, PN2 coupled to the bottom terminals of the pump capacitors Cx towards circuit ground (i.e., the potential at V2−). If the pulldown devices 302a, 302b are engaged during the shutdown state, the charge pump capacitors Cx will not fully discharge relative to the voltage at terminal V2+. If the pulldown devices 302a, 302b are not engaged during the shutdown state but are engaged during the pre-switching period of the startup state, the charge pump capacitors Cx may fully discharge during the shutdown state but will gently charge off of the voltage at terminal V2+ through the inherent body-diodes D2-D5 during the pre-switching period of the startup state at a reduced rate. Either approach avoids or minimizes the magnitude of the in-rush of current from $C_{OUT}$ towards the pump capacitors Cx when the low-side phase switches S7, S8 are enabled at the start of charge pump switching. In some embodiments, if the pulldown devices 302a, 302b are engaged while in the pre-switching period, the voltage at the phase nodes PN1, PN2 may be monitored so that the pulldown devices 302a, 302b can be disengaged (disabled/disconnected) once the phase nodes PN1, PN2 are pulled close to ground; thereafter, the switches S7 and S8 can be turned ON and switched until steady-state operation is reached.

In variant embodiments, the pulldown devices 302a, 302b may be a binary switch FET in series with an impedance, such as a resistor. For example, FIG. 3B is a schematic diagram of a switched pulldown device 302x comprising a transistor-based switch $Sw_{PD}$ in series with a resistor $R_{PD}$ that may be used as one or both of the pulldown devices 302a, 302b of FIG. 3A. Note that the order of connection of the switch $Sw_{PD}$ and the resistor $R_{PD}$ can be reversed.

In general, there need be only one switched pulldown device 302x per phase node PNx. However, in some cases (for example, if separate phase node connections per pump capacitor are implemented for various reasons, such as to facilitate die or board layout), the switched pulldown device 302x of FIG. 3B may be implemented on a per charge pump capacitor basis (i.e., one switched pulldown device 302x for each of the charge pump capacitors Cx).

For pulldown devices 302a, 302b that include a switch, the state of the pulldown devices 302a, 302b during the shutdown state and/or the pre-switching period may be controlled by suitably programming or configuring the controller 104. The pulldown devices 302a, 302b may be regarded as "soft" pulldown devices for the resistive or current-controlled manner in which the devices pull down on the phase nodes PNx. In contrast, switches S7 and S8 have very low ON resistance and will pull down the phase nodes PNx very strongly ("hard") when closed (ON).

It should be noted that the circuits and methods described in this section for pulling down the phase nodes PNx may be used in conjunction with the circuits and methods described below.

B. Rebalancing Solutions

1. Dedicated Rebalancer Circuit

One aspect of the invention encompasses embodiments that rebalance charge pump capacitors during a pre-switching period of the startup state before switching begins. Rebalancing involves setting the voltage across each of the charge pump capacitors Cx (e.g., C1-C4 in FIGS. 2 and 3) to approximate (e.g., within about ±20%) target multiples of the voltage at the output terminal (e.g., V2+ in FIGS. 2 and 3) by discharging and/or precharging the charge pump capacitors, either simultaneously or sequentially, before the start of switching operation.

Figure 4:
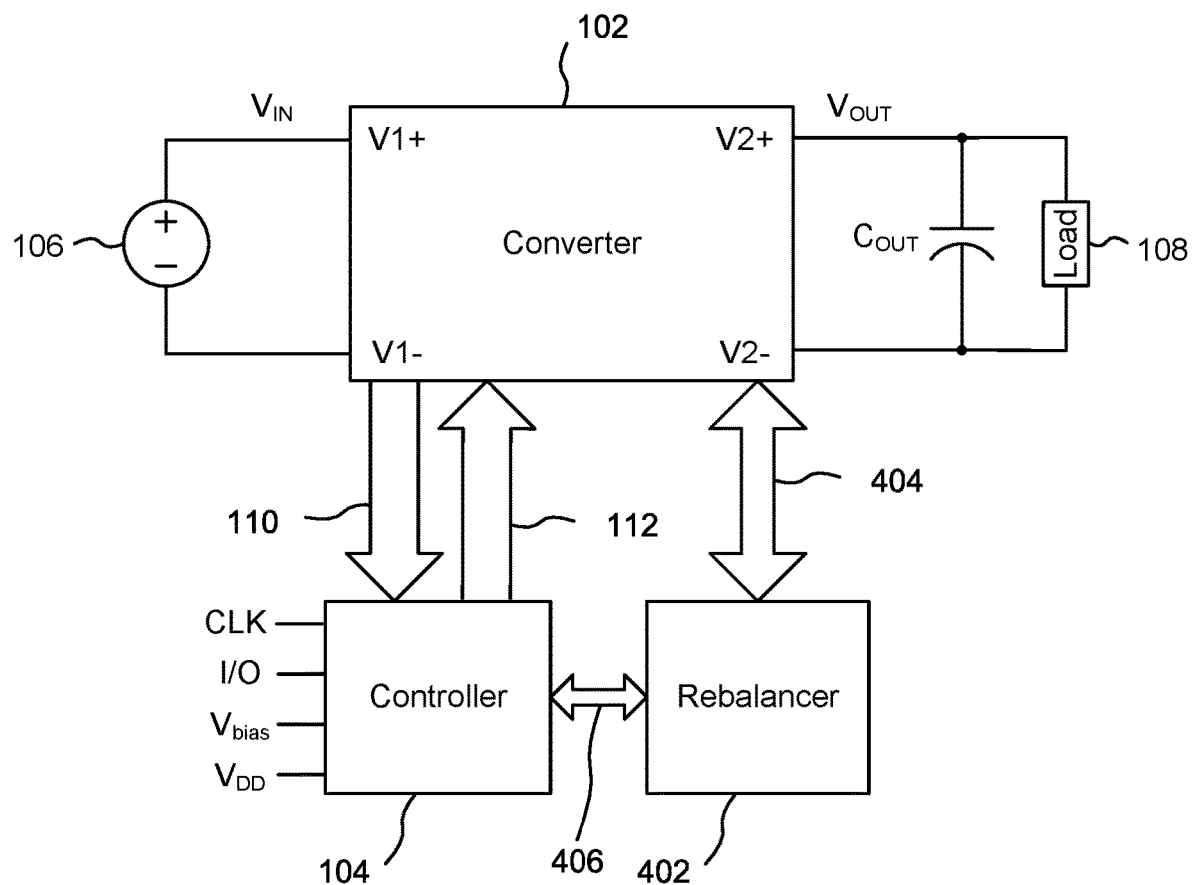
FIG. 4 is a block diagram of a switched-capacitor step-down power converter configured for use with a dedicated rebalancer circuit.

One approach to rebalancing charge pump capacitors in a switched-capacitor step-down converter is to use a dedicated rebalancer circuit. For example, FIG. 4 is a block diagram 400 of a switched-capacitor step-down power converter configured for use with a dedicated rebalancer circuit. The illustrated embodiment is similar to the circuit of FIG. 1 but includes a rebalancer circuit 402 coupled to the converter circuit 102 by a first bus 404 and to the controller 104 by a second bus 406. The function of the rebalancer circuit 402 is to (1) sense the output voltage $V_{OUT}$ across $C_{OUT}$ during a pre-switching period of the startup state and output a signal indicative of the output voltage, and (2) as a function of the output signal indicative of the output voltage, balance the voltage across the charge pump capacitors by either charging or discharging the charge pump capacitors towards corresponding steady-state multiples of $V_{OUT}$. If the voltage across a pump capacitor is higher than its corresponding steady state multiple of $V_{OUT}$, the pump capacitor is discharged. If the voltage across a pump capacitor is lower than its corresponding steady state multiple of $V_{OUT}$, the pump capacitor is charged.

Figure 5A:
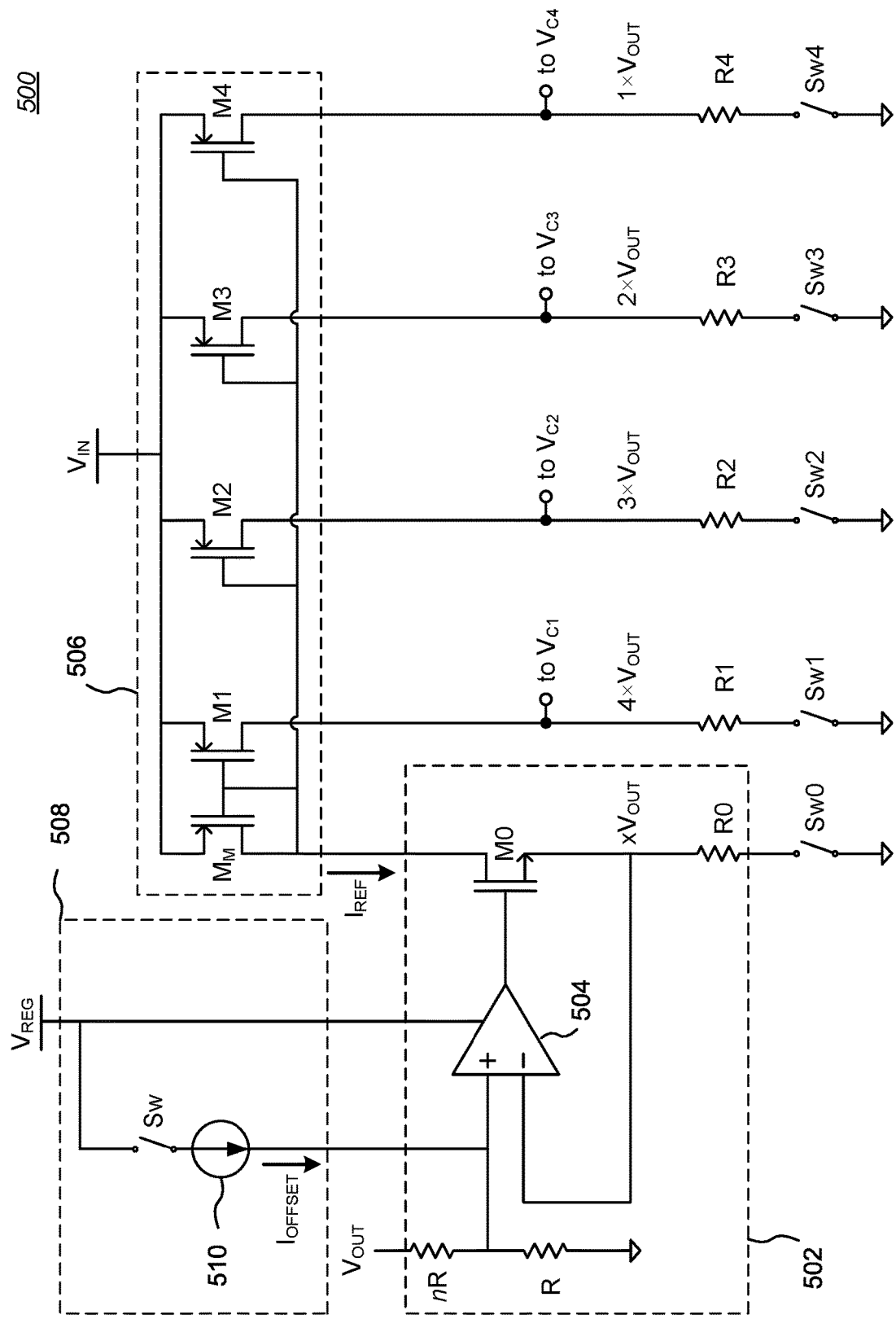
FIG. 5A is a schematic diagram of a first type of rebalancer circuit suitable for use as the rebalancer circuit of FIG. 4.
Figure 5B:
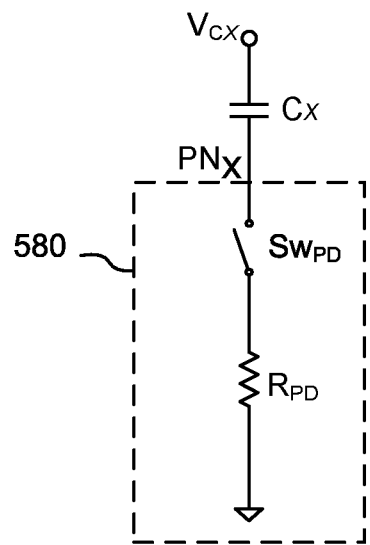
FIG. 5B is a schematic diagram of a switched pulldown resistor circuit suitable for use in conjunction with the rebalancer circuit of FIG. 5A.
Figure 5C:
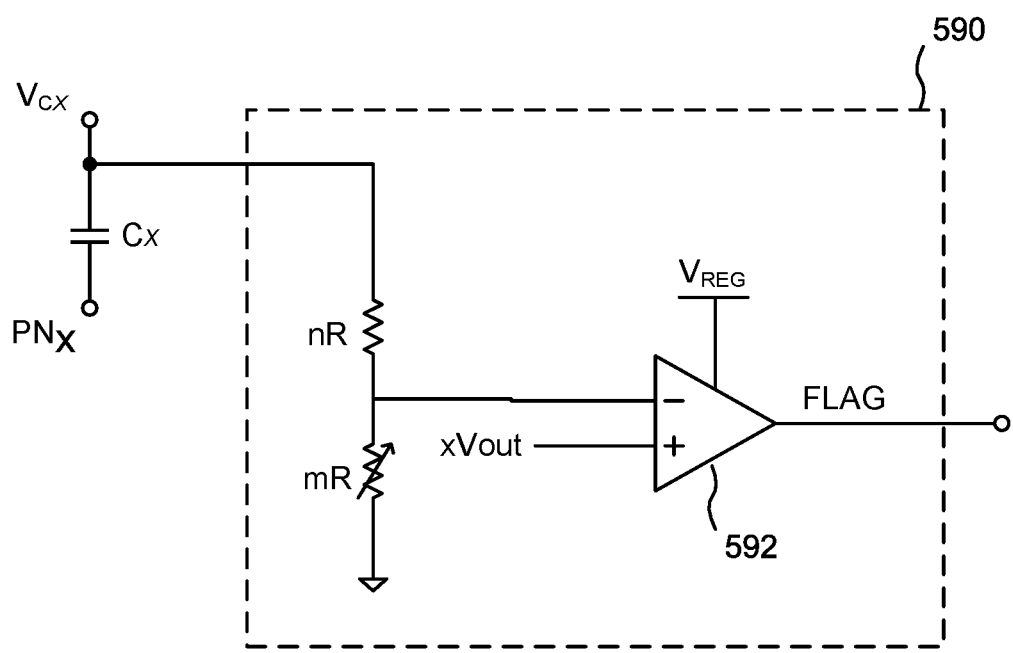
FIG. 5C is a schematic diagram of a balancing comparator suitable for use in conjunction with the rebalancer circuit of FIG. 5A.

Embodiments of the rebalancer circuit 402 may comprise one or more subcircuits. For example, FIG. 5A is a schematic diagram of a first type of rebalancer circuit 500 suitable for use as the rebalancer circuit 402 of FIG. 4. FIG. 5B is a schematic diagram of a switched pulldown resistor circuit 580 suitable for use in conjunction with the rebalancer circuit 500 of FIG. 5A. FIG. 5C is a schematic diagram of a balancing comparator 590 suitable for use in conjunction with the rebalancer circuit 500 of FIG. 5A.

In FIG. 5A, the output voltage $V_{OUT}$ of a switched-capacitor converter circuit, such as the type shown in FIG. 3A, is applied to a voltage sensing subcircuit 502 during startup. More specifically, $V_{OUT}$ is applied to a voltage divider comprising series-connected resistors nR and R, where n represents a scaling factor. The scaled voltage is coupled to a first input of a differential amplifier 504, the output of which is coupled to the gate of a FET M0. The source of FET M0 is coupled to a second input of the differential amplifier 504 and to a resistor R0 coupled to circuit ground. The drain of FET M0 is coupled to the drain and gate of a mirror driver FET $M_M$ in a current mirror circuit 506. A regulated voltage $V_{REG}$ powers the differential amplifier 504.

In this example, the input voltage to the current mirror circuit 506 is supplied by $V_{IN}$ to the switched-capacitor power converter. The example current mirror circuit 506 includes four mirroring legs comprising FETs M1-M4 having respective sources coupled to $V_{IN}$, respective drains coupled to corresponding resistors R1-R4, and respective gates coupled to the drain and gate of FET $M_M$ (and thus to the drain of FET M0). In operation, $V_{OUT}$ is sensed by the differential amplifier 504 and a reference current $I_{REF}$ is produced through FET M0 and FET $M_M$ equal to the voltage at the input of the differential amplifier 504 divided by R0: $I_{REF}=xV_{OUT}/R0$, where $xV_{OUT}$ is proportional to $V_{OUT}$ by the ratio 1/(n+1) and n is the scaling factor for resistor nR.

The reference current $I_{REF}$ is proportional to $V_{OUT}$, and is mirrored in each of the mirroring legs, in known fashion. The mirror current in each of the mirroring legs generates a corresponding voltage set by the value of the corresponding resistors R1-R4. Thus, in this example, R1 should be set such that $I_{REF} \times R1$ ideally equals $4 \times V_{OUT}$ at a node connected to stack-node $V_{C1}$, which is the "top" plate of capacitor C1 (see FIG. 3A). Similarly, R2 should be set such that $I_{REF} \times R2$ ideally equals $3 \times V_{OUT}$ at a node connected to stack-node $V_{C2}$; R3 should be set such that $I_{REF} \times R3$ ideally equals $2 \times V_{OUT}$ at a node connected to stack-node $V_{C3}$; and R4 should be set such that $I_{REF} \times R4$ ideally equals $1 \times V_{OUT}$ at a node connected to stack-node $V_{C4}$. Alternatively, the value of resistors R1-R4 can be the same while the size ratio of FETs M1-M4 in each mirroring leg can be scaled relative to FET $M_M$ to achieve a similar outcome.

The rebalancer circuit 500 of FIG. 5A may be used after operation of pulldown circuits coupled to the "bottom" plate of the charge pump capacitors Cx (e.g., C1-C4 in FIG. 3A). The switched pulldown resistor circuit 580 in FIG. 5B is essentially identical to the switched pulldown device 302x of FIG. 3B but shown in the context of being coupled between a pump capacitor Cx and circuit ground. During a pre-switching period of the startup state, before the rebalancer circuit 500 would be engaged, the switch $Sw_{PD}$ of the switched pulldown resistor circuit 580 is closed, thus tying the "bottom" plate (which is coupled to a phase node PNx) of the corresponding charge pump capacitor Cx to circuit ground through a small pulldown resistor $R_{PD}$ (e.g., 100-200Ω) to enable charging through the "top" plate of the charge pump capacitor Cx.

Note that while the switched pulldown resistor circuit 580 (as well as the switched pulldown device 302x of FIG. 3B) allows charging of the pump capacitors Cx, the resistive nature of such switched pulldown circuits compared to the low-side phase switches S7, S8 means that charging of the pump capacitors Cx occurs much more slowly and the capacitor voltage can be significantly different from the target voltage, depending on charge or discharge current× switched pulldown circuit $R_{ON}$. This contradicts the goal of the rebalancer circuit 402, which aims to bring the pump capacitor voltages to a specific voltage level. Again, the goal of the switched pulldown resistor circuit 580 (as well as the switched pulldown device 302x of FIG. 3B) is to minimize in-rush current from $C_{OUT}$ to the pump capacitors Cx by implementing a soft-charging of Cx off of $C_{OUT}$. Once the phase nodes PN1, PN2 have reached circuit ground or the pump capacitors Cx are fully soft-charged, the phase nodes PN1, PN2 can be pulled low by the low-side phase switches S7, S8 and the rebalancer circuit 402 may then be enabled to charge or discharge the pump capacitors Cx towards corresponding steady-state multiples of $V_{OUT}$. The switched pulldown resistor circuit 580 may remain enabled in parallel with enabled low-side phase switches S7, S8 while the rebalancer circuit 402 is enabled, or may be disabled by opening switch $Sw_{PD}$ before enabling the rebalancer circuit 402.

Referring back to FIG. 5A, the voltages output by the mirroring legs of the current mirror circuit 506 represent target voltages that the pump capacitors C1-C4 should be charged or discharged towards with respect to the sensed output voltage $V_{OUT}$. During startup, if $V_{OUT}$ is high, the reference voltage $xV_{OUT}$ will be high, resulting in a high value for $I_{REF}$ and thus high values for the target voltages across each of the resistors R1-R4. Consequently, the pump capacitors C1-C4 and their corresponding stack-nodes $V_{CX}$ having a lower voltage will begin to charge to the target voltages across the corresponding resistors R1-R4 (i.e., multiples of $V_{OUT}$) during a pre-switching period of the startup state. Conversely, if $V_{OUT}$ is low (e.g., due to a fault event such as a short circuit) during startup, the reference voltage $xV_{OUT}$ will be low, resulting in a low value for $I_{REF}$ and thus low values for the target voltages across each of the resistors R1-R4. Consequently, any excess voltage on the pump capacitors C1-C4 and their corresponding stack-nodes $V_{CX}$ will begin to discharge through the resistors R1-R4 to circuit ground during a pre-switching period of the startup state. The charging or discharging time is proportional to the capacitance of the pump capacitors C1-C4 and the reference current $I_{REF}$. Thus, each mirror leg is configured to provide both a corresponding target-multiple of the output voltage of the converter in response to the reference current $I_{REF}$ and a circuit path to circuit ground through a corresponding resistor.

In the embodiment illustrated in FIG. 5A, optional switches Sw0-Sw4 may be included between respective resistors R0-R4 and circuit ground. When the rebalancer circuit 500 is in use (e.g., during the pre-switching period of the startup state), switches Sw0-Sw4 would be closed. Switches Sw0-Sw4 may be opened during steady-state operation to avoid power consumption by the rebalancer circuit 500.

While the rebalancer circuit 500 may be used on a timed basis, a robust and fast-acting embodiment preferably includes active voltage balance comparison circuits to measure and balance the voltages at the stack-nodes $V_{CX}$, either simultaneously or sequentially For example, instances of the balancing comparator 590 of FIG. 5C may be connected to each stack-node $V_{CX}$ (i.e., the top plate of corresponding pump capacitors Cx) through a voltage divider comprising series-connected resistors nR and mR, where n represents a scaling factor and m represents a settable or adjustable value. The scaled voltage is coupled to a first input of a comparator circuit 592 powered by a regulated voltage $V_{REG}$. The voltage $xV_{OUT}$ from the rebalancer circuit 500 of FIG. 5A is coupled to a second input of the comparator circuit 592 as a reference voltage. The balancing comparators 590 are configured to provide a logic "low" or a logic "high" FLAG output from the comparator circuit 592 that may be coupled to logic control circuitry (not shown, but may be a multi-input AND gate) or circuitry within controller 104.

In operation, when the rebalancer circuit 402 is engaged during the pre-switching period of the startup state of a charge pump and the process of charging/discharging starts, the respective balancing comparators 590 compare the voltage at the stack-nodes $V_{CX}$ (representing the voltage across the pump capacitors Cx) to $xV_{OUT}$. In one example embodiment, each balancing comparator 590 is configured to require that the voltage across its respective pump capacitor Cx is within a desired range (e.g., 80% to 120%) of the target value in order to generate an "in range" FLAG output (which may be a logic "high" or "low" as needed for the logic control circuitry). The desired range may be set, for example, by changing the division ratios of the resistors nR and mR, such as by setting or adjusting the value of resistor mR.

The FLAG outputs of the balancing comparators 590 can be used as inputs to logic control circuitry that determines when all capacitors satisfy the specified "in range" condition, upon which the voltage balancing process is stopped and the startup state transitions from the pre-switching period to the subsequent switching period in which charge pump switching commences but steady-state operation is not yet achieved. For example, the rebalancer circuit 500 may be disabled by opening switches Sw0-Sw4 in FIG. 5A.

One advantage of using balancing comparators 590 over a timed rebalancing sequence is that the switched-capacitor power converter does not have to wait for the worst-case RC time constants inherent in both the rebalancer circuit 402 and converter circuit 102 to ensure that the pump capacitors Cx are voltage balanced. This saves on the startup and recovery time if restarting a converter circuit 102 into intermediate conditions (e.g., $C_{OUT}$ and/or $C_{PUMP}$ are at varying precharged and/or discharged degrees) between Scenario 1, 2, or 3.

For robustness, it is useful to configure the rebalancer circuit 500 to cope with atypical states that may arise in particular applications, such as the case of a short circuit across the load terminals where $C_{OUT}$ becomes fully discharged (note that restarting a switched-capacitor power converter after a short circuit would be similar to starting up in Scenario 3). In the case of a short circuit where the output voltage $V_{OUT}$ is close to or at circuit ground, then $I_{REF}$, which is generated from $V_{out}$, may be insufficient for proper operation of the rebalancer circuit 500. Accordingly, it is useful to provide an offset current that is enabled when a short circuit is detected and/or when $V_{OUT}$ is less than a desired level sufficient to generate an adequate value for $I_{REF}$.

Referring to FIG. 5A, a switchable offset current circuit 508 comprises a current source 510 coupled to the first input of the differential amplifier 504 and to the regulated voltage $V_{REG}$ through a switch Sw. The switch Sw is opened or closed based on detection of a short circuit condition or near short circuit condition. In some embodiments, it may be useful to define a "short circuit condition" as a voltage level for $V_{OUT}$ that is less than or equal to about 20% of the target value for $V_{OUT}$, which should be $V_{IN}/Div$, where Div is the designed conversion gain ratio for the switched-capacitor converter circuit 300. A short circuit condition may be detected in a number of known ways, including by using a circuit similar to the balancing comparator 590 of FIG. 5C to scale and compare $V_{OUT}$ against a reference voltage.

If a short circuit condition is detected, switch Sw is closed, and an offset current $I_{OFFSET}$ will be generated by the current source 510 and applied to the first input of the differential amplifier 504, thereby skewing the voltage normally generated by applying $V_{OUT}$ to the voltage divider comprising series-connected resistors nR and R. Once the short circuit condition ends or is deemed to end (e.g., with $V_{OUT}$ having a value above the level defining the "short circuit condition", or after a period of time), then switch Sw may be opened again. A minor drawback of including the switchable offset current circuit 508 is that an offset may be created in the target voltage for the pump capacitors Cx, meaning that the pump capacitors Cx may not be ideally balanced. However, the offset will be limited and short circuit conditions normally should be infrequent. An alternative implementation to the switchable offset current circuit 508 that accomplishes a similar outcome is to introduce a systematic or preferential offset within the differential amplifier 504 itself, so that the output of the differential amplifier 504 generates an adequate value for $I_{REF}$ even while the output voltage $V_{OUT}$ is close to or at circuit ground (i.e., the short circuit condition). One way to introduce such an offset within the differential amplifier 504 is to skew the sizes of transistors/devices used within the differential amplifier 504, in known fashion.

As should be appreciated, the current mirror circuit 506 may have fewer or more mirroring legs for switched-capacitor power converters of different conversion ratios. In addition, for a multi-phase power converter, some or all of the mirroring legs may be duplicated for connection to a different phase. In some applications, one or more of the mirror leg resistors (e.g., R1-R4) may be variable to accommodate switched-capacitor power converters that can be configured to have different conversion ratios (e.g., divide-by-2 or divide-by-3). One such power converter is described in U.S. Pat. No. 10,263,514, issued Apr. 16, 2019, entitled "Selectable Conversion Ratio DC-DC Converter", assigned to the assignee of the present invention and hereby incorporated by this reference.

Figure 6A:
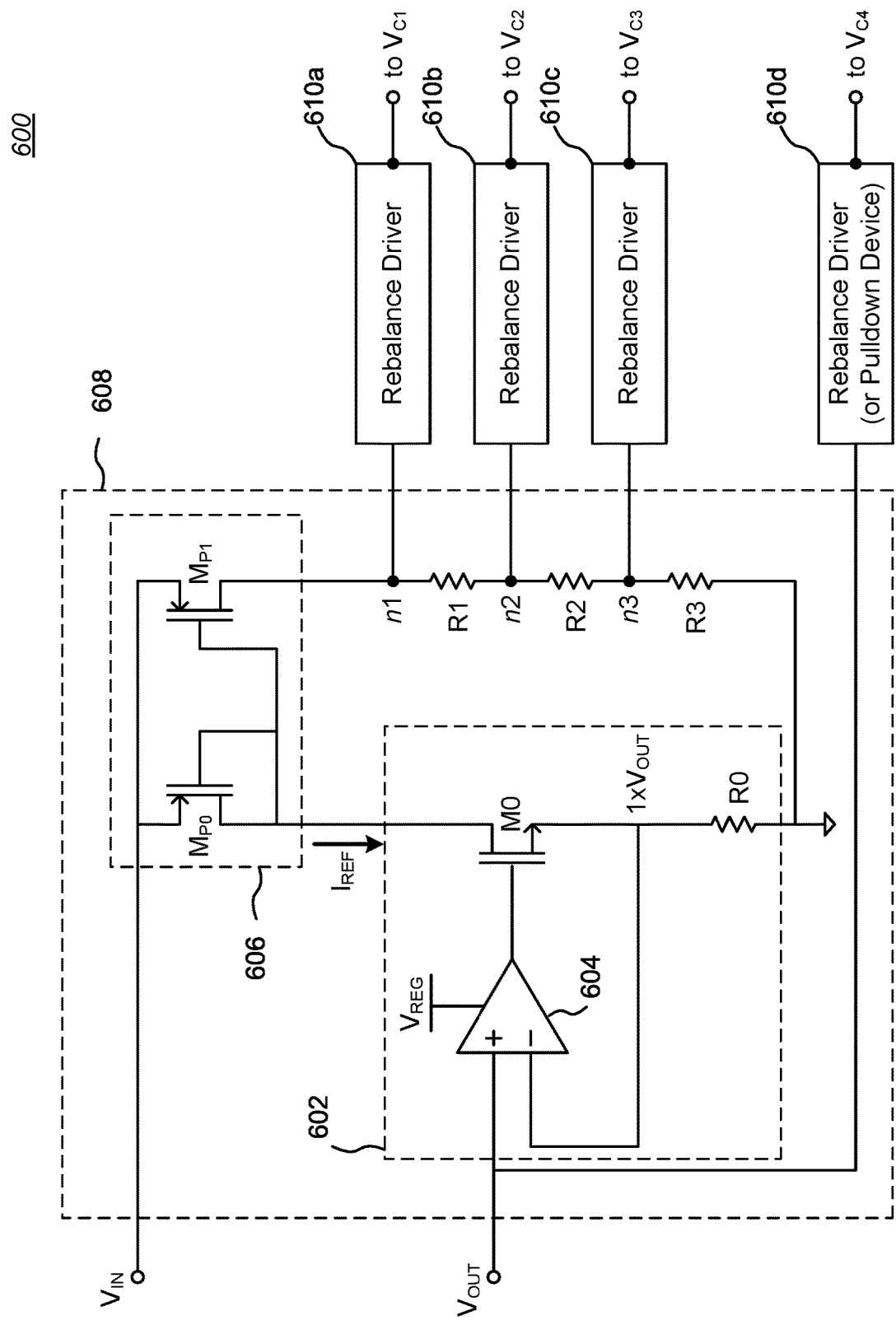
FIG. 6A is a schematic diagram of a second embodiment of a rebalancer circuit suitable for use as the rebalancer circuit of FIG. 4.

The rebalancer circuit 402 of FIG. 4 may be implemented with other circuitry. For example, FIG. 6A is a schematic diagram of a second embodiment of a rebalancer circuit 600 suitable for use as the rebalancer circuit 402 of FIG. 4. In FIG. 6A, the output voltage $V_{OUT}$ of a switched-capacitor converter circuit, such as the type shown in FIG. 3A, is applied to a voltage sensing subcircuit 602 during startup. More specifically, $V_{OUT}$ is applied to a first input of a differential amplifier 604, the output of which is coupled to the gate of a FET M0. Note that $V_{OUT}$ may first be scaled by a voltage divider if needed, as in FIG. 5A. The source of FET M0 is coupled to a second input of the differential amplifier 604 and to a resistor R0 coupled to circuit ground. The drain of FET M0 is coupled to the drain and gate of FET $M_{P0}$ and to the gate of FET $M_{P1}$ in a current mirror circuit 606. A regulated supply voltage $V_{REG}$ powers the differential amplifier 604. In essence, the voltage sensing subcircuit 602 implements a voltage-to-current converter where the voltage $V_{OUT}$ is converted into a proportional current labeled as $I_{REF}$ in FIG. 6A.

In this example, the supply voltage to the current mirror circuit 606 is supplied by the input voltage $V_{IN}$ to a coupled switched-capacitor converter circuit. The example current mirror circuit 606 includes one mirroring leg comprising FET $M_{P1}$ having its source coupled to $V_{IN}$ and its drain coupled to series-connected resistors R1-R3. The series-connected resistors R1-R3 are in turn coupled to circuit ground. The voltage sensing subcircuit 602, current mirror circuit 606, and series-connected resistors R1-R3 can be considered to comprise a bias generator 608.

$V_{OUT}$ is sensed by the differential amplifier 604 and a reference current $I_{REF}$ is produced through FET M0 and FET $M_{P0}$ that is equal to the voltage at the input of the differential amplifier 604 divided by R0: $I_{REF}=V_{OUT}/R0$. The reference current $I_{REF}$ is directly proportional to $V_{OUT}$, and is mirrored in the mirroring leg, in known fashion. The mirror current in the mirroring leg generates a set of corresponding voltages determined by the values of the resistors R1-R3. Thus, in this example, R1-R3 should be set such that $I_{REF} \times (R1+R2+R3)$ ideally equals $4 \times V_{OUT}$ at a node n1. Similarly, R2-R3 should be set such that $I_{REF} \times (R2+R3)$ ideally equals $3 \times V_{OUT}$ at a node n2; R3 should be set such that $I_{REF} \times R3$ ideally equals $2 \times V_{OUT}$ at a node n3. Thus, the generated voltages at the nodes nx are each a multiple of the output voltage $V_{OUT}$ of the coupled converter circuit. Alternate methods of generating voltages at the nodes nx from the sensed output voltage $V_{OUT}$ are possible and include using operational amplifiers or voltage multipliers (not shown).

The voltages at the nodes nx and the output voltage $V_{OUT}$ are coupled to rebalance drivers 610a-610d, which are in turn are connected to corresponding stack-nodes $V_{CX}$, which are the "top" plates of respective pump capacitors Cx (see FIG. 3A). The rebalance drivers 610a-610d provide charge to the pump capacitors Cx through the corresponding stack-nodes $V_{CX}$ or provide a discharge path for the pump capacitors Cx from the corresponding stack-nodes $V_{CX}$ so that the voltages at the stack-nodes $V_{CX}$ become approximately equal to the corresponding voltages at the nodes nx. In this way, the pump capacitors Cx are charged to voltages approximately equal to the corresponding voltages at the nodes nx.

Figure 6B:
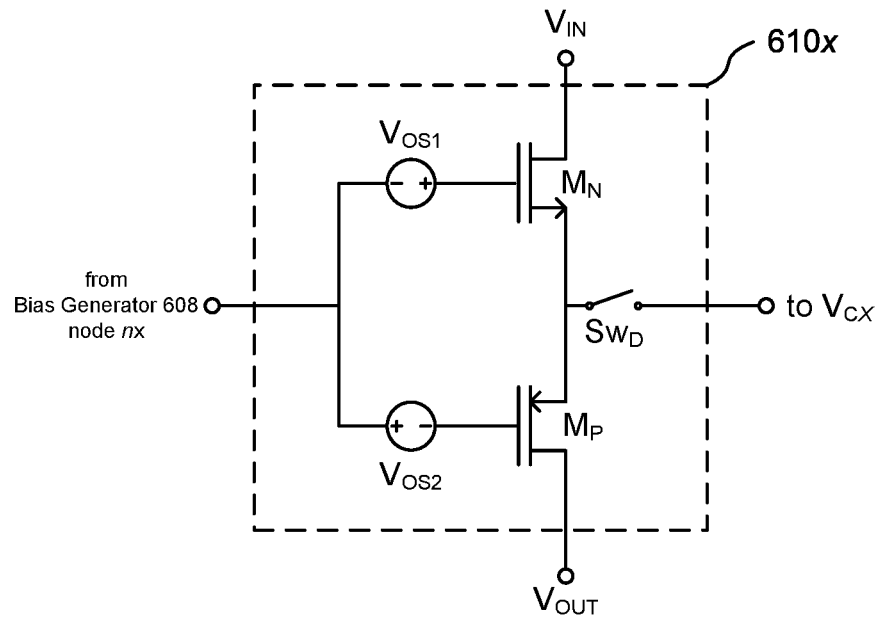
FIG. 6B is a schematic diagram of a first embodiment of a rebalance driver suitable for use in the rebalancer circuit of FIG. 6A.

FIG. 6B is a schematic diagram of a first embodiment of a rebalance driver 610x suitable for use in the rebalancer circuit 600 of FIG. 6A. In this embodiment, the rebalance driver 610x comprises a voltage buffer that includes series-connected FETs $M_N$ and $M_P$ coupled between $V_{IN}$ and $V_{OUT}$ in a push-pull topology. The gates of FETs $M_N$ and $M_P$ are coupled to a voltage from a node nx of the bias generator 608 in the rebalancer circuit 600 of FIG. 6A. Optional voltage offsets $V_{OS1}$, $V_{OS2}$ may be introduced between node nx and the gate terminals of N-type FET $M_N$ and P-type FET $M_P$, respectively, so that the voltage buffer more accurately biases its output node (i.e., the source terminals of FETs $M_N$ and $M_P$) to the voltage at node nx.

The output node of the voltage buffer is coupled to an enable/disable switch $Sw_D$, which in turn is coupled to a stack-node $V_{CX}$. When rebalancing is needed during a pre-switching period of the startup state, switch $Sw_D$ is enabled (closed). Once rebalancing is completed and charge pump switching begins, $Sw_D$ is disabled (opened) to isolate the voltage buffer from the stack-node $V_{CX}$.

When switch $Sw_D$ is enabled (closed), the voltage generated at node nx, buffered by the rebalance driver 610x, charges a corresponding pump capacitor Cx from $V_{IN}$ through FET $M_N$ if the voltage across the pump capacitor Cx is lower, and otherwise provides a discharge path to $V_{OUT}$ through FET $M_P$ if the voltage across the pump capacitor Cx is higher. An alternate embodiment of rebalancer driver 610x may have the drain terminal of FET $M_P$ coupled to circuit ground instead of $V_{OUT}$. While this alternate embodiment accomplishes a similar discharging function when needed, the charge removed from the pump capacitor is wasted and cannot be recouped.

If the voltage offsets $V_{OS1}$, $V_{OS2}$ are not used, the voltage buffer still works except that the buffer output voltage will end up below the voltage at node nx (by an amount approximately equal to the FET $M_N$ threshold voltage) when pre-charge is predominant through N-type FET $M_N$, and above the voltage at node nx (by an amount approximately equal to the FET $M_P$ threshold voltage) when discharge is predominant through P-type FET $M_P$. The voltage offsets $V_{OS1}$, $V_{OS2}$ may be omitted in applications where the threshold voltage error is tolerable.

Note that the rebalance driver 610d for stack-node $V_{C4}$ node in FIG. 6A may be implemented more simply by using a pulldown device (e.g., the switched pulldown device 302x in FIG. 3B) across stack-node $V_{C4}$ and stack-node Vx (which couples to the converter output voltage $V_{OUT}$), since it is desired that the voltage at stack-node $V_{C4}$ after balancing should equal $V_{OUT}$.

One advantage of the rebalancer circuit 600 of FIG. 6A compared to the rebalancer circuit 500 of FIG. 5A is that when a pump capacitor Cx is discharging, the excess charge is transferred by the rebalance driver 610x to the output capacitor $C_{OUT}$ (i.e., the source of $V_{OUT}$), rather than discharged to circuit ground. Furthermore, the rebalance driver 610x does not have to simultaneously pull current from $V_{IN}$ in order to achieve the desired voltage level at the $V_{CX}$ stack-nodes. Notably, the direct transfer of excess pump capacitor charge to the output capacitor $C_{OUT}$ is less wasteful and the reduced $V_{IN}$ current draw when performing pump capacitor discharge may shorten the duration of rebalancing a switched-capacitor power converter by at least a factor of two.

Figure 6C:
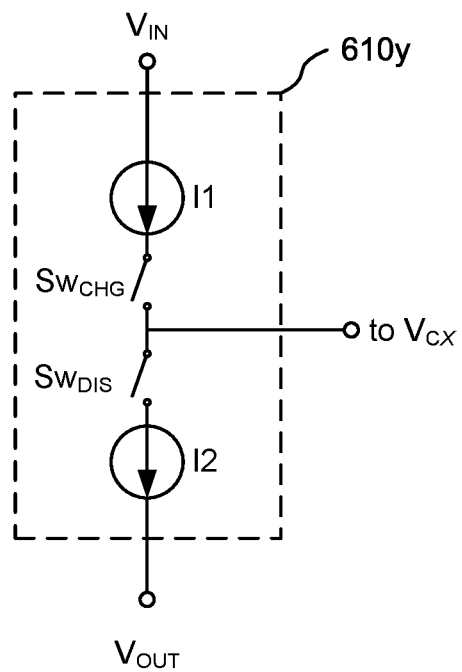
FIG. 6C is a schematic diagram of a second embodiment of a rebalance driver suitable for use in the rebalancer circuit of FIG. 6A.

FIG. 6C is a schematic diagram of a second embodiment of a rebalance driver 610y suitable for use in the rebalancer circuit 600 of FIG. 6A. In the illustrated embodiment, the rebalance driver 610y comprises a switchable current source that includes a first current source I1 coupled between the input voltage $V_{IN}$ of a converter circuit and a first switch $Sw_{CHG}$. The first switch $Sw_{CHG}$ is series-connected to a second switch $Sw_{DIS}$. A second current source I2 is coupled between the second switch $Sw_{DIS}$ and the output voltage $V_{OUT}$ of the converter circuit. A midpoint between the current sources I1, I2 and switches $SW_{CHG}$, $SW_{DIS}$ is coupled to a stack-node $V_{CX}$. In variant embodiments, the relative order of the first current source I1 and the first switch $Sw_{CHG}$ may be reversed, and the relative order of the second current source I2 and the second switch $Sw_{DIS}$ may be reversed. In other variant embodiments, the first current source I1 and first switch $Sw_{CHG}$ may be coupled to a higher-voltage stack-node (e.g., above stack-node $V_{CX}$) instead of $V_{IN}$, while the second current source I2 and second switch $Sw_{DIS}$ may be coupled to circuit ground or a lower-voltage stack-node (e.g., below stack-node $V_{CX}$).

When the first switch $Sw_{CHG}$ is enabled (closed) while the second switch $Sw_{DIS}$ is disabled (opened), the first current source I1 charges a corresponding pump capacitor Cx whose top plate is connected to an associated stack-node $V_{CX}$. Conversely, when the first switch $Sw_{CHG}$ is disabled (opened) while the second switch $Sw_{DIS}$ is enabled (closed), the second current source I2 discharges a corresponding pump capacitor Cx whose top plate is connected to the associated stack-node $V_{CX}$. Whether or not a charging or discharging function is needed for a particular pump capacitor Cx can be determined by first comparing each stack-node voltage $V_{CX}$ and the output voltage $V_{OUT}$, for example, by using the balancing comparator 590 of FIG. 5C. Once either the first switch $Sw_{CHG}$ or the second switch $Sw_{DIS}$ is enabled, the corresponding stack-node voltage $V_{CX}$ continues to be monitored or measured in order to determine whether the enabled switch can be opened once the associated stack-node voltage $V_{CX}$ has reached its target voltage.

More generally, an advantage of the dedicated rebalancer circuit 402 is that, even when the stack-nodes $V_{CX}$ and/or $V_{OUT}$ have voltages close to zero, the rebalancer circuit 402 does not get stuck or waste time going through unnecessary rebalancing, thereby reducing startup time. Using a dedicated rebalancer circuit 402 to rebalance the voltages across the pump capacitors Cx can prevent over-stress of the charge pump switches (including transistors in corresponding driver circuits) upon startup from a wide variety of initial conditions. In some embodiments, only one core cell of the rebalancer circuit 402 (e.g., voltage sensing subcircuit 502 and current mirror circuit 506 in FIG. 5A, or the bias generator 608 in FIG. 6A) is needed for both charging or discharging all the pump capacitors Cx. In addition, startup time may be reduced through monitoring the voltage across the pump capacitors Cx using voltage comparators and selecting the most optimal action to take (e.g., charge only, discharge only, or no rebalancing needed).

2. Rebalancing of Charge Pump Capacitors During a Pre-Switching Period

Another aspect of the invention encompasses embodiments that rebalance charge pump capacitors during a pre-switching period of the startup state (i.e., before charge pump switching begins) by repurposing existing switches or existing switch pathways within the charge pump, thereby reducing design complexity and area.

For example, when rebalancing the step-down converter circuit 200 of FIG. 2, the voltage across C1 ideally should be set to about $4 \times V_{OUT}$, the voltage across C2 ideally should be set to about $3 \times V_{OUT}$, the voltage across C3 ideally should be set to about $2 \times V_{OUT}$, and the voltage across C4 ideally should be set to about $1 \times V_{OUT}$. More generally, if the conversion gain of a single-phase symmetric cascade multiplier is n, where n is an integer number, there will be (n−1) pump capacitors, the maximum steady-state voltage across a pump capacitor will be $(n-1) \times V_{OUT}$, and the minimum steady-state voltage across a pump capacitor will be $1 \times V_{OUT}$. Rebalancing involves discharging and/or precharging the n−1 charge pump capacitors simultaneously or sequentially to voltage levels that are approximately their steady-state multiples of $V_{OUT}$. Note also that the concept of rebalancing may also apply to other types of charge pumps, although the target voltage levels for rebalancing the pump capacitors may be different. For example, a series-parallel charge pump configuration with conversion gain n will have the same steady-state voltage of $1 \times V_{OUT}$ for all its pump capacitors.

In some embodiments of charge pumps, such as the example shown in FIG. 3A, some or all of the switches Sx (e.g., S1-S9 in FIG. 3A) of the charge pump may be implemented as a segmented FET. A segmented FET has multiple parallel independently-controllable drain-to-source conduction pathways, including at least one primary switch pathway Sx and at least one auxiliary switch pathway SxA. Each drain-to-source conduction pathway can be independently opened or closed by controlling the FET gate terminal associated with that pathway. An auxiliary switch pathway SxA has a higher ON resistance $R_{ON}$ than the primary switch pathway Sx. In other embodiments, one or more smaller auxiliary FETs SxA may be connected in parallel with one or more corresponding primary switches Sx (e.g., S1-S9 in FIG. 3A). A smaller parallel auxiliary switch SxA has a higher ON resistance $R_{ON}$ than a corresponding primary switch Sx. An advantage of auxiliary switches/pathways SxA is that they limit the rate of charge transfer between capacitors due to having a relatively high $R_{ON}$ compared to the corresponding primary switches Sx.

In charge pump embodiments having auxiliary switches/pathways SxA, one technique for rebalancing charge pump capacitors during a pre-switching period of a startup state involves using the existing auxiliary switches/pathways SxA and specialized initialization switch timing sequences to precharge or discharge the charge pump capacitors Cx based on the scenario presented. Beneficially, this technique requires no new charge pump circuit pathways, but only selection of a set of clock timing sequences based on a measurement of the voltages across the charge pump capacitors Cx (i.e., the voltages at the stack-nodes $V_{CX}$). The voltages may be measured, for example, by instances of the balancing comparator 590 of FIG. 5C connected to each stack-node $V_{CX}$ (i.e., the top plate of corresponding pump capacitors Cx). The balancing comparators 590 may, if desired, be included in a controller 104.

Figure 7A:
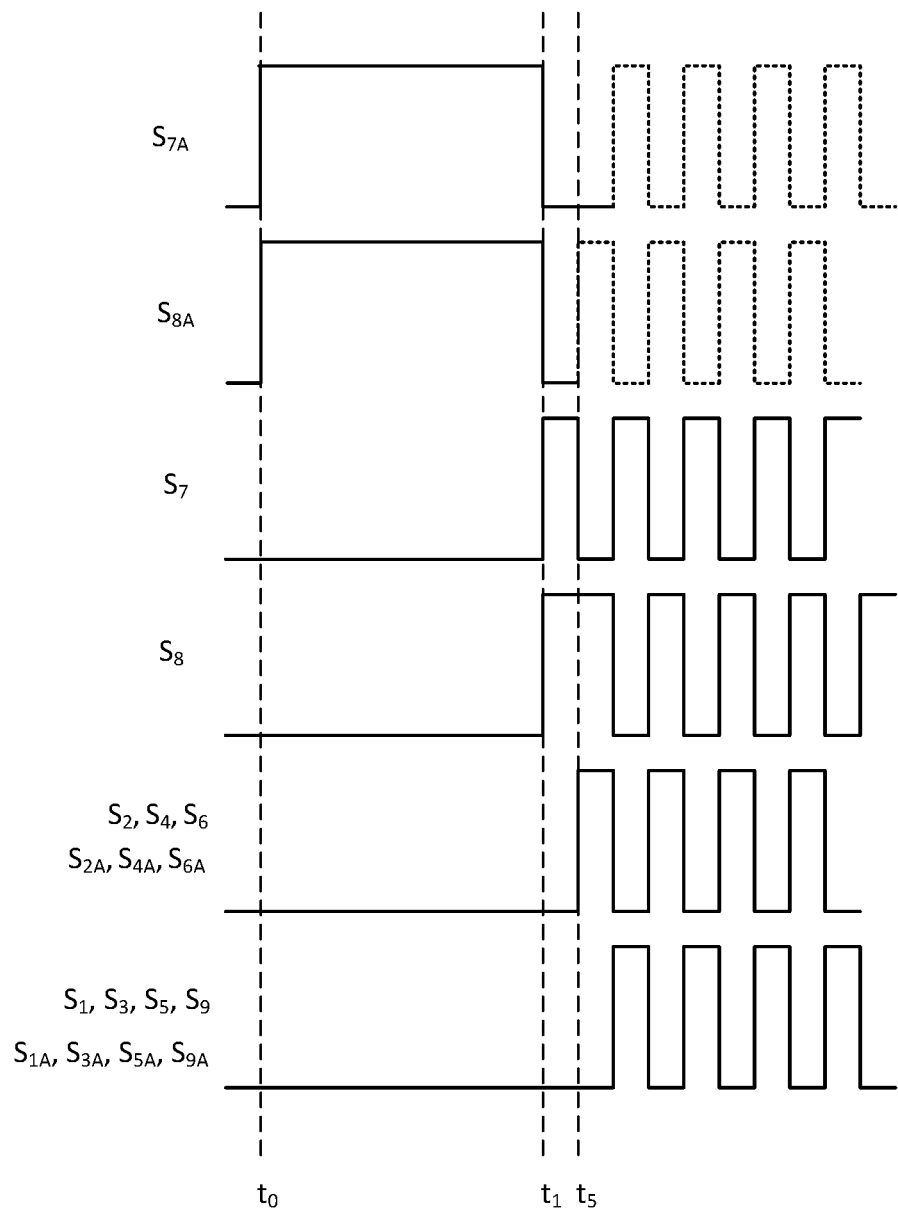
FIG. 7A is a diagram of a set of switch timing sequences that addresses Scenario 1 (non-precharged $C_{OUT}$, non-precharged Cx) before and after charge pump operation begins.

For example, FIG. 7A is a diagram 700 of a set of switch timing sequences that addresses Scenario 1 (non-precharged $C_{OUT}$, non-precharged Cx) before and after charge pump operation begins. Using the charge pump 300 example shown in FIG. 3A, in a shutdown state prior to time $t_0$, all of the switches Sx (including auxiliary switches/pathways SxA) are initially open (OFF). Scenario 1 is detected if the voltage across $C_{OUT}$ and the voltages at the stack-nodes $V_{CX}$ are all measured to be below some desired value, or deemed to be essentially zero for a particular application. Upon enabling the charge pump 300 beginning at to, a pre-switching period of the startup state begins where an embodiment of the phase node pull-down concept described previously in FIG. 3A is applied. For example, the pump capacitors Cx can be precharged off of any available charge on the $C_{OUT}$ capacitor by closing (ON) the auxiliary switches/pathways S7A and S8A during a time period from time $t_0$ to time $t_1$ while all other switches Sx and SxA are open (OFF).

In this example, auxiliary switches/pathways S7A and S8A are used in lieu of the separate switched pulldown devices 302x shown in FIG. 3B. The relatively high $R_{ON}$ of the auxiliary switches/pathways S7A and S8A results in a "soft" pulldown of the phase-nodes PN1, PN2. At time $t_1$, the auxiliary switches/pathways S7A and S8A are opened (OFF), and the corresponding primary switches S7 and S8 are closed (ON) for a "hard" pulldown of the phase-nodes PN1, PN2.

In a variant embodiment, the auxiliary switches/pathways S7A and S8A may remain closed between time $t_1$ and $t_5$, in parallel with corresponding closed primary switches S7 and S8. In some embodiments, the high-side phase switches S6, S9 need not have corresponding auxiliary switches/pathways S6A, S9A; however, in the example shown in FIG. 7A, the high-side phase switches S6, S9 do have corresponding optional auxiliary switches/pathways S6A, S9A.

Time $t_1$ can be implemented as a fixed duration after time $t_0$ or as a variable duration based on when the phase-nodes PN1, PN2 are detected to have reached a voltage sufficiently close enough to the voltage at the V2− terminal of the charge pump 300, and/or when the pump capacitors Cx are detected to have been charged sufficiently off of the $C_{OUT}$ capacitor. Note that in Scenario 1, the duration between time $t_0$ and time $t_1$ is most likely short to the point of being relatively unnecessary given the relatively low voltage level across the $C_{OUT}$ capacitor to begin with. Therefore, it is possible to skip or omit this precharging step of enabling auxiliary switches/pathways S7A and S8A between time $t_0$ and time $t_1$. Furthermore, since the voltages across the pump capacitors Cx (i.e., the voltages at the stack-nodes $V_{CX}$) are all low as well, and often sufficiently close to the voltage across $C_{OUT}$, either phase-node "soft" pulldown or rebalancing in Scenario 1 is not always needed and may be skipped.

The pre-switching period ends at $t_1$ and charge pump switching begins at time $t_5$ as shown in FIG. 7A, where switching is controlled by clock waveforms P1 and P2. After time $t_5$, the auxiliary switches/pathways S7A and S8A may continue to be opened (OFF) or may be switched in parallel with their corresponding primary switches S7 and S8 to further reduce the ON resistance $R_{ON}$ of each combined segmented FET S7/S7A and S8/S8A. Consequently, the timing waveforms associated with the auxiliary switches/pathways S7A and S8A are shown with dotted lines after time $t_5$. The opening and closing of all auxiliary switches/pathways and their corresponding primary switches from time $t_1$ to time $t_5$ and beyond can be governed by the controller 104 of FIG. 1.

The period from time $t_1$ to time $t_5$ may be part of the switching period of the startup state in which charge pump switching may commence but steady-state operation is not yet achieved. The duration from time $t_1$ to time $t_5$ is application dependent, but may be, for example, how long it takes to decide to bypass the rebalancing process. Depending on the implementation, time $t_5$ could overlap with time $t_1$ (i.e., time $t_1$ and time $t_5$ occur at the same time), or there can be a delay from time $t_1$ to time $t_5$ less than or equal to the charge pump period, which is the inverse of the charge pump switching frequency (technically, the delay can be greater than the charge pump period as well, although this then adds to the overall startup time of the charge pump). Note also that the omission of intermediate time point labels between time $t_1$ and time $t_5$ is only so that the labels for time points $t_1$ and $t_5$ match up with the like-named time points in FIGS. 7B and 7C.

Figure 7B:
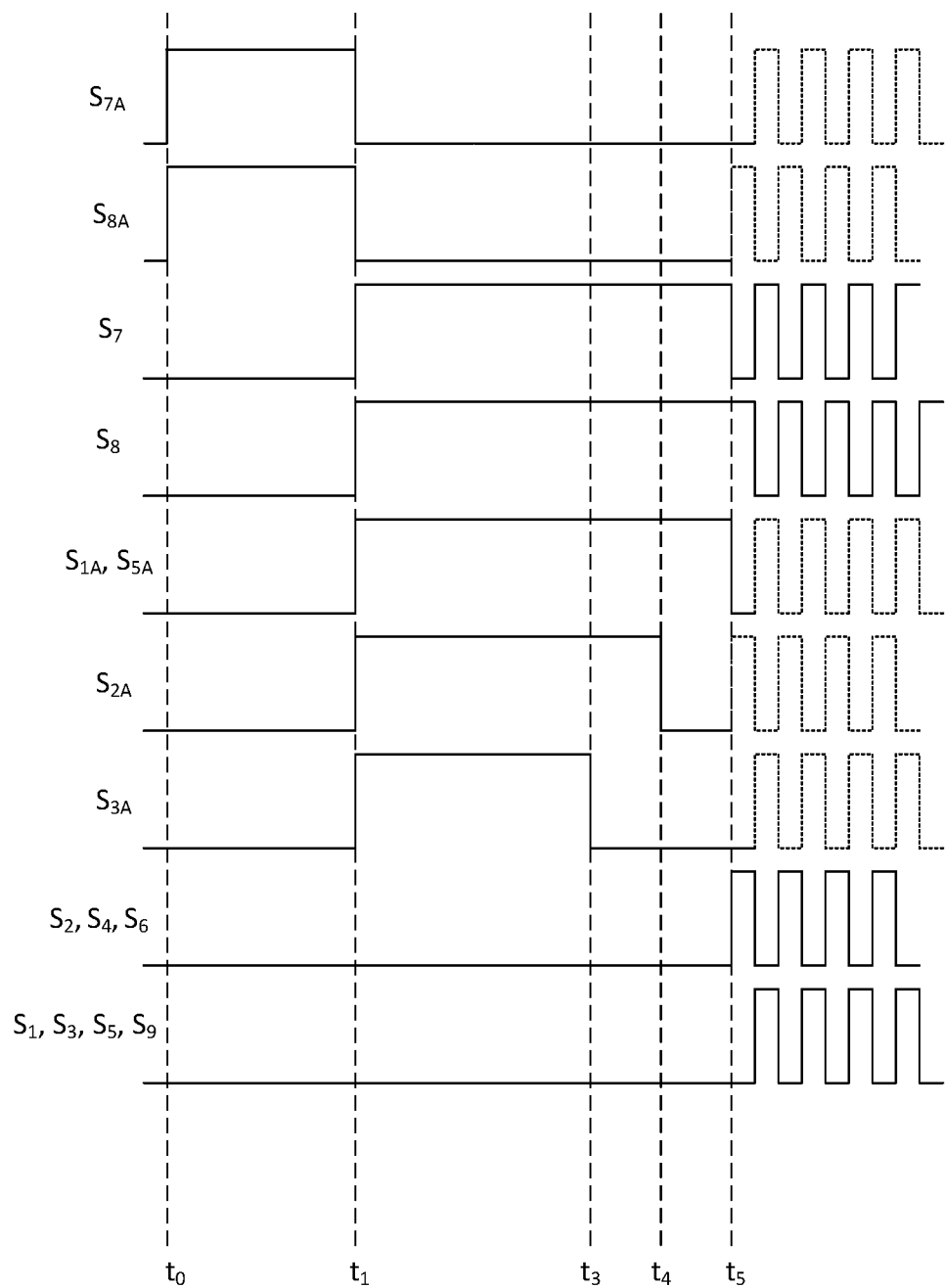
FIG. 7B is a diagram of a set of switch timing sequences that addresses Scenario 2 (precharged $C_{OUT}$, non-precharged Cx) before and after charge pump operation begins.

As another example, FIG. 7B is a diagram 720 of a set of switch timing sequences that addresses Scenario 2 (pre-charged $C_{OUT}$, non-precharged Cx) before and after charge pump operation begins. Similar to FIG. 7A, auxiliary switches/pathways S7A and S8A are closed (ON) during a time period from time $t_0$ to time $t_1$ to function as "soft" pulldown devices while all other switches are open (OFF) during a pre-switching period of the startup state. This ensures that the phase-nodes PN1, PN2 are coupled through a resistance, $R_{ON}$, to circuit ground at the V2− terminal of the charge pump 300 in order to gently precharge the charge pump capacitors Cx off of the charge on the output capacitor $C_{OUT}$. Thereafter, at time $t_1$—when the phase-nodes PN1, PN2 are detected to have reached a voltage sufficiently close enough to the voltage at the V2− terminal of the charge pump 300—the auxiliary switches/pathways S7A and S8A are opened (OFF). In a variant embodiment, the auxiliary switches/pathways S7A and S8A may remain closed between time $t_1$ and $t_5$, in parallel with corresponding closed primary switches S7 and S8. At or soon after time $t_1$, switches S7 and S8 are closed (ON) during a time period from time $t_1$ to time $t_5$; time $t_5$ marks the end of the pre-switching period of the startup state, and the beginning of switched operation controlled by clock waveforms P1 and P2. Similar to timing diagram 700, the timing waveforms associated with the auxiliary switches/pathways S7A and S8A are shown with dotted lines after time $t_5$. This is to indicate that the auxiliary switches/pathways S7A and S8A may continue to be opened (OFF) or may be switched in parallel with their corresponding primary switches S7 and S8 to further reduce the combined ON resistance $R_{ON}$.

Beginning at time $t_1$, auxiliary switches/pathways S1A-S3A, S5A are all closed (more generally, auxiliary switches/pathways S1A-$S_m$A except $S_{m-1}$A would all be closed at time $t_1$, where m is the number of series-connected switches between the V1+ and V2+ charge pump terminals). After time $t_1$, the (m−1) selected auxiliary switches/pathways are progressively opened in reverse order relative to terminal V1+(S3A to S1A, in the illustrated example) over several time periods. In the illustrated example, in reverse order, auxiliary switches/pathways S3A to S1A are progressively opened from time $t_3$ to time $t_5$. Notably, the auxiliary switch/pathway S5A is kept closed throughout this initialization phase, thus keeping the charge pump capacitor C4 connected in parallel with the output capacitor $C_{OUT}$. Accordingly, for the present example, when all auxiliary switches/pathways S1A-S3A are all closed from time $t_1$ to time $t_3$, a voltage source coupled to terminal V1+ will precharge pump capacitors C1-C3. At time $t_3$, auxiliary switch/pathway S3A is opened, and charge pump capacitor C3 ceases to charge. At time t4, auxiliary switch/pathway S2A is opened, and charge pump capacitor C2 ceases to charge. Finally, at time $t_5$, auxiliary switch/pathway S1A is opened, and charge pump capacitor C1 ceases to charge. Also at time t5, auxiliary switch/pathway S5A is opened, and charge pump capacitor C4 ceases to be charged by the output capacitor $C_{OUT}$. At or after time $t_5$, switched operation following clock waveforms P1 and P2 can commence (the dotted timing pulse lines after time $t_5$ indicate that the auxiliary switches/pathways S1A-S3A, S5A may be switched to follow the state of respective primary switches S1-S3, S5 or kept open). Note that the omission of an intermediate time point label between time $t_1$ and time $t_3$ is only so that the labels for time points $t_1$ and $t_3$-$t_5$ match up with the like-named time points in FIGS. 7A and 7C.

Time points $t_3$, t4, and $t_5$ may be fixed by a timing circuit (not shown), or may be determined by adaptive time periods initiated after time $t_1$, taking into account the values of each charge pump capacitor C1-C4, the ON resistance of auxiliary switch/pathways S1A-S3A, S5A, as well as the voltage levels at each stack-node $V_{C1}$-$V_{C4}$ relative to the voltage level at the Vx node. Alternatively, the voltage levels at each stack-node $V_{C1}$-$V_{C4}$ (i.e., the voltage levels across each charge pump capacitor C1-C4) may be monitored throughout times $t_1$-$t_5$, using circuits like voltage or current comparators or instances of the balancing comparator 590 of FIG. 5C. When the voltage level at a stack-node $V_{CX}$ is measured to be at or sufficiently close to its target, the closest auxiliary switch/pathway SxA charging the corresponding pump capacitor Cx is opened (OFF) to disconnect the precharge path from terminal V1+ through the series-connected auxiliary switches/pathways. Accordingly, opening the auxiliary switches/pathways SxA may be a function of measured stack-node voltage rather than a fixed sequence.

For example, referring to FIG. 3A, the voltages at stack-nodes $V_{C1}$-$V_{C4}$ may be compared against respective reference voltages to determine when the voltages across the pump capacitors C1-C4 approximate (e.g., within about ±20%) target multiples of the voltage across the output capacitor $C_{OUT}$. For instance, when pump capacitor C3 has charged to its target voltage range (i.e., $2 \times V_{OUT}$), a comparator coupled to stack-node $V_{C3}$ can cause switch S3A to be opened, thus defining time $t_3$. The other time points would be defined in a similar manner.

An alternate embodiment that implements timing diagram 720 involves using a different set of auxiliary switches/pathways that connect between each stack-node $V_{CX}$ and the V1+ terminal. However, while this alternate embodiment provides flexibility regarding the order in which each auxiliary switch/pathway may be opened between time $t_1$ to time $t_5$, each auxiliary switch/pathway may no longer be in parallel with an existing primary switch Sx, thereby introducing new pathways that add complexity and require secondary ESD protection schemes.

Since one goal of the pre-switching period is to precharge the charge pump capacitors Cx to target voltage levels, it becomes apparent that closing first and second "low-side" phase switches S7 and S8 throughout times $t_1$-$t_5$ is necessary.

While the timing diagram 720 shows that the auxiliary switches/pathways S1A-S3A, S5A are set to an ON state continuously during particular time periods from time $t_1$ to time $t_5$, in alternative embodiments the auxiliary switches/pathways S1A-S3A, S5A may be pulsed ON and OFF during those time periods to avoid excessive power/thermal dissipation. Note also that the deadtime between opening and closing of all switches is not shown for clarity, but that some dead-time may be needed to avoid momentary connections that may cause undesired charging or discharging of the pump capacitors Cx.

Figure 7C:
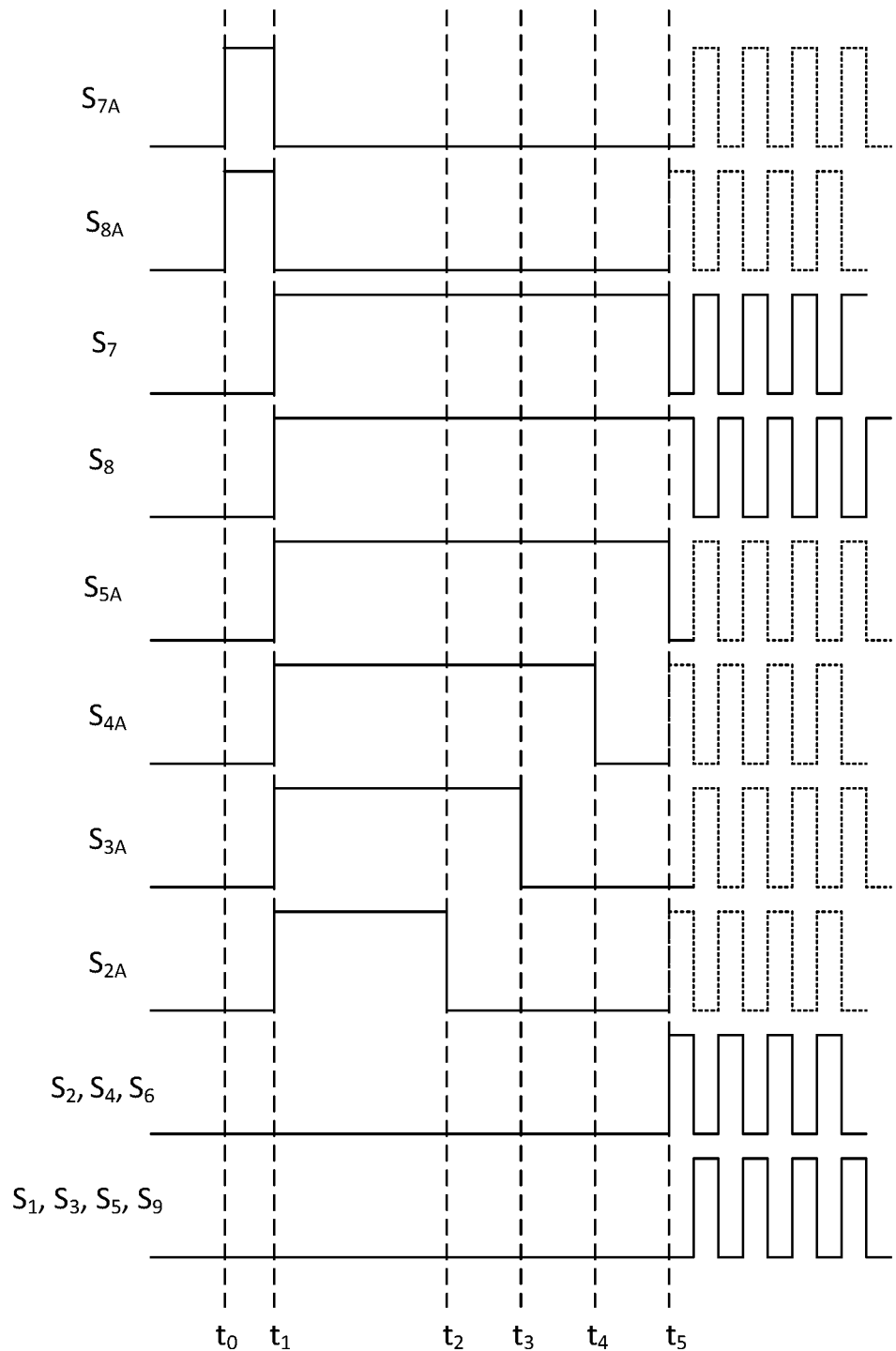
FIG. 7C is a diagram of a set of switch timing sequences that addresses Scenario 3 (non-precharged $C_{OUT}$, precharged Cx) before and after charge pump operation begins.

As yet another example, FIG. 7C is a diagram 740 of a set of switch timing sequences that addresses Scenario 3 (non-precharged $C_{OUT}$, precharged Cx) before and after charge pump operation begins. In this case, auxiliary switches/pathways S7A and S8A are closed (ON) during a time period from time $t_0$ to time $t_1$ to function as "soft" pulldown devices while all other switches are open (OFF) during a pre-switching period of the startup state. This ensures that the phase-nodes PN1, PN2 are coupled through a resistance, $R_{ON}$, to circuit ground at the V2− terminal in order to gently precharge the charge pump capacitors Cx off of the charge on the output capacitor $C_{OUT}$. Thereafter, switches S7 and S8 are closed (ON) from time $t_1$ to time $t_5$, time $t_5$ marks the end of the pre-switching period of the startup state, and the beginning of switched operation controlled by clock waveforms P1 and P2. While the timing diagram 740 shows that auxiliary switches/pathways S7A and S8A are open (OFF) from time $t_1$ to time $t_5$, the auxiliary switches/pathways S7A and S8A instead may be switched to follow the state of respective switches S7 and S8 at all times. Note that because the charge pump capacitors Cx are precharged in this scenario, the period from time $t_0$ to time $t_1$ is generally shorter than the case covered by FIG. 7B. Note also that if the charge pump capacitors Cx are in fact fully precharged, and the output capacitor $C_{OUT}$ is not pre-charged at all, then this processing sequence may be superfluous. However, a robust circuit design should support intermediate scenarios in which the charge pump capacitors Cx are not fully precharged, and the output capacitor $C_{OUT}$ is somewhat pre-charged. Further, from a design point of view, this sequence helps reduce implementation complexity by reducing the number of optional states in the startup sequence, thus allowing implementation of the same sequence of states and relying on the sequence duration being shorter or longer as needed to achieve a robust startup.

Beginning at time $t_1$, auxiliary switches/pathways S2A-S5A are all closed, and then progressively opened in forward order relative to terminal V1+(S2A to S5A, in the illustrated example) from time $t_2$ to time $t_5$ (more generally, auxiliary switches/pathways S2A-SmA would all be closed at time $t_1$, where m is the number of series-connected switches between the V1+ and V2+ charge pump terminals). Notably, switches S1 and S1A (if present) are kept open through the initialization phase, thus isolating the charge pump capacitors from the $V_{IN}$ voltage at terminal V1+. Accordingly, for the present example, when the auxiliary switches/pathways S2A-S5A are all closed from time $t_1$ to time $t_2$, the charge pump capacitors C1-C4 will discharge into the output capacitor $C_{OUT}$ that is coupled to the Vx node. At time $t_2$, auxiliary switch/pathway S2A is opened and charge pump capacitor C1 ceases to discharge. At time $t_3$, auxiliary switch/pathway S3A is opened and charge pump capacitor C2 ceases to discharge. At time t4, auxiliary switch/pathway S4A is opened and charge pump capacitor C3 ceases to discharge. Finally, at time $t_5$, auxiliary switch/pathway S5A is opened and charge pump capacitor C4 ceases to discharge. At time $t_5$, switched operation following clock waveforms P1 and P2 can commence (the dotted timing pulse lines after time $t_5$ indicate that the auxiliary switches/pathways S2A-S5A may be switched to follow the state of respective switches S2-S5, or kept open).

As with the example shown in FIG. 7B, the duration of the intervals from time $t_1$ to time $t_5$ may be fixed by a timing circuit (not shown) or may be variable and determined by one or more factors, including pump capacitor voltage, voltage at the output capacitor $C_{OUT}$, as well as the ON resistance of auxiliary switches/pathways S2A-S5A.

Accordingly, opening the auxiliary switches/pathways SxA may be a function of measured stack-node voltage (e.g., pump capacitor voltage) rather than a fixed sequence. While the timing diagram 740 shows that the auxiliary switches/pathways S2A-S5A are set to an ON state continuously during particular time periods from time $t_1$ to time $t_5$, in alternative embodiments the auxiliary switches/pathways S2A-S5A may be pulsed ON and OFF during those time periods to avoid excessive power/thermal dissipation. Note also that the deadtime between opening and closing of all switches is not shown for clarity.

An alternate embodiment that implements timing diagram 740 involves using a different set of auxiliary switches/pathways that connect between each stack-node $V_{CX}$ to the Vx node. However, while this alternate embodiment provides flexibility regarding the order in which each auxiliary switch/pathway may be opened between time $t_1$ to time $t_5$, each auxiliary switch/pathway may no longer be in parallel with an existing primary switch Sx, thereby introducing new pathways that add complexity and require secondary ESD protection schemes.

Yet another embodiment that implements timing diagram 740 involves using a different set of auxiliary switches/pathways that connect between each stack-node $V_{CX}$ to circuit ground at the V2− terminal. In addition to sharing the disadvantages of complexity and ESD secondary protection, this method is also more wasteful since each charge pump capacitor Cx is discharged to ground rather than transferring its charge to the output capacitor $C_{OUT}$.

More generally, an advantage of this invention compared to the dedicated rebalancer circuit 402 lies in its simplicity, area efficiency, and reduced ESD risk. The voltages across the pump capacitors Cx can be rebalanced similarly to prevent over-stress of the charge pump switches (including transistors in corresponding driver circuits) upon startup from a wide variety of initial conditions. This aspect of the invention achieves this by repurposing existing switches or existing switch pathways within the charge pump 300, thereby eliminating the need for a rebalancer circuit 402.

3. Rebalancing Capacitors by Decoupling from Input Voltage Source

Yet another aspect of rebalancing charge pump capacitors in a switched-capacitor step-down power converter at startup involves running the converter backwards as a step-up converter for a selected time, and then reverting to step-down operation. This method works best when starting up from Scenario 2 (precharged $C_{OUT}$, non-precharged Cx), and if the output capacitor $C_{OUT}$ is sufficiently large to minimize any $V_{OUT}$ voltage droop that could occur during step-up operation.

Figure 8:
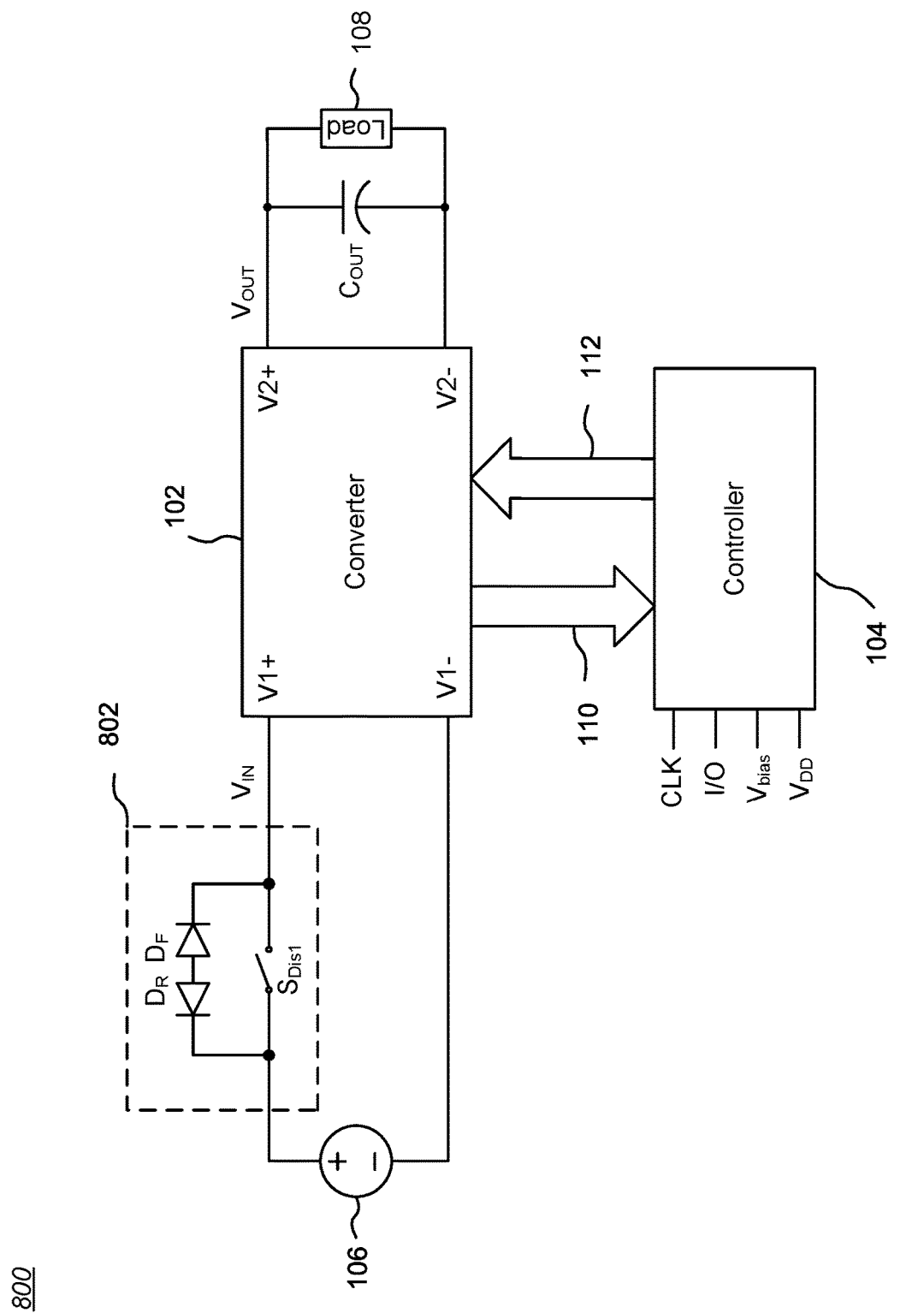
FIG. 8 is a block diagram of a switched-capacitor power converter that can be selectively operated as a step-down converter or as a step-up converter and which can be selectively isolated from the input voltage source.

FIG. 8 is a block diagram of a switched-capacitor power converter 800 that can be selectively operated as a step-down converter or as a step-up converter and which can be selectively isolated from the voltage source 106. The basic circuit is similar to the circuit of FIG. 1, with the addition of a switch block 802 that includes a disconnect switch $S_{Dis1}$. The disconnect switch $S_{Dis1}$ may comprise two separate series-connected FET switches with corresponding body diodes $D_F$ and $D_R$ configured with opposite polarities, to essentially fully isolate the voltage source 106 from terminal V1+ of the converter circuit 102 when the disconnect switch $S_{Dis1}$ is open. Alternatively, the disconnect switch $S_{Dis1}$ may comprise a single transistor that provides suitable bi-directional isolation (e.g., transistors based on GaAs or GaN or SOI technologies), or any other type of switch that provides suitable bidirectional isolation. Control signals (not shown) from the controller 104 to the switch block 802 control the open or closed state of the disconnect switch $S_{Dis1}$.

For startup, the converter circuit 102 can be configured to operate in a step-up mode by making the voltage $V_{OUT}$ across the output capacitor $C_{OUT}$ be the power source of the converter circuit 102, rather than the voltage source 106 (noting that many charge pump designs can operate in step-up mode by changing where the voltage source is applied). Accordingly, during startup, the disconnect switch $S_{Dis1}$ is set to an open state to disconnect the voltage source 106 from the converter circuit 102, leaving only the voltage $V_{OUT}$ across the output capacitor $C_{OUT}$ as a power source for the converter circuit 102. Switched operation following clock waveforms P1 and P2 can commence, causing charge transfer from the output capacitor $C_{OUT}$ through the pump capacitors Cx, towards the V1+ terminal of the converter circuit 102. The duration of this initial startup state can be determined, for example, by measuring the voltages at the stack-nodes $V_{CX}$ as described above, or by setting a pre-determined time duration. Once the pump capacitors Cx are suitably charged to their steady-state voltages (in this case, multiples of the voltage $V_{OUT}$), the disconnect switch $S_{Dis1}$ is closed, thereby reconfiguring the converter circuit 102 to operate in a step-down mode by reconnecting the voltage source 106 to the converter circuit 102. Accordingly, the converter circuit 102 reverts to step-down operation from the startup step-up mode. Note that a brief intermediate state may be introduced between initial reverse step-up mode and normal forward step-down operation where charge pump switching is paused and then the disconnect switch $S_{Dis1}$ is closed. This intermediate state may be skipped or omitted as long as the disconnect switch $S_{Dis1}$ can be closed in a gradual manner to minimize voltage transients or in-rush current at the V1+ terminal. It should also be noted that the disconnect switch $S_{Dis1}$ may be entirely omitted if the presence or connection of voltage source 106 across the V1+, V1− charge pump terminals can be sequenced together with the startup of converter circuit 102. For instance, the voltage source 106 can be disconnected from the converter circuit 102 or made to be high impedance in the shutdown state. When the converter circuit 102 is enabled, the voltage source 106 can remain disconnected or high impedance while the converter circuit 102 begins startup in reverse step-up mode. At the end of this initial startup state in step-up mode, the voltage source 106 can then be connected to the converter circuit 102 or made low impedance for the remainder of startup as well as for steady-state operation as a step-down converter. More generally, an advantage of this invention is that pump capacitor rebalancing takes place without requiring a dedicated rebalancer circuit 402 or specialized switch timing sequences during a pre-switching period of the startup state.

C. Reducing the Rate of Charge Transfer at Startup

A novel technique that achieves robust startup of a charge pump under a variety of startup scenarios involves commencing switching of the charge pump by the P1 and P2 clock waveforms right at the beginning of startup (i.e., without any pre-switching period or other initialization phase) and in step-down mode, but with a reduced rate of charge transfer per switching cycle, and therefore a reduced rate of voltage change at each of the $V_{CX}$ stack-nodes (see FIG. 3A). Such a reduction in charge transfer rate may be accomplished in several ways.

Figure 9:
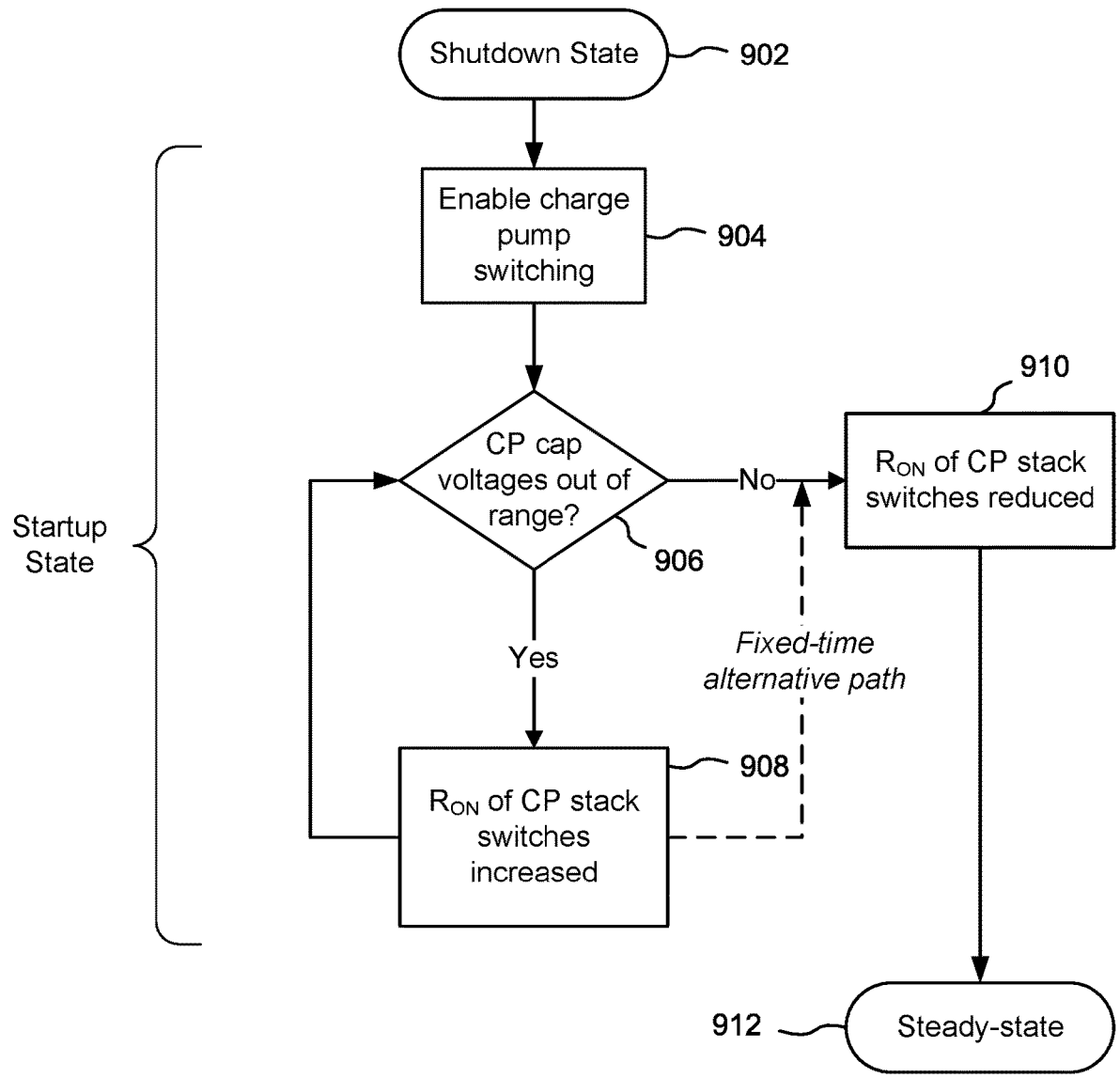
FIG. 9 is a flow chart of one embodiment of a reduced charge transfer rate process.

For example, FIG. 9 is a flow chart 900 of one embodiment of a reduced charge transfer rate process. Starting from a shutdown state (block 902), charge pump switching following clock waveforms P1 and P2 is enabled (block 904).

Thereafter, if the measured voltages across the charge pump (CP) capacitors are outside a desired range of values (block 906), then the ON resistance $R_{ON}$ of the series-connected charge pump switches (e.g., S1-S5 in FIG. 3A) may be increased for a selected duration of time or number of switching cycles in a startup phase (block 908). If the measured voltages across the CP capacitors are within a desired range of values (block 906), then $R_{ON}$ generally would be reduced for power efficiency for the remainder of startup operation (block 910) and during steady-state operation (block 912). Note that repeated testing at block 906 may be omitted if increased $R_{ON}$ (block 908) is applied solely as a fixed time duration prior to reducing $R_{ON}$ (block 910), as indicated by the dashed line labeled "fixed-time alternative path". In either case, the rate of charge transfer per switching cycle will be reduced while $R_{ON}$ is increased, at the expense of a slightly longer startup time.

The ON resistance $R_{ON}$ of the series-connected charge pump switches (e.g., S1-S5) may be controlled by temporarily using the corresponding auxiliary switches/pathways SxA, each of which has a higher ON resistance $R_{ON}$ than the corresponding primary switch Sx, for a selected duration of time or number of switching cycles in lieu of the primary switches Sx. A segmented FET may be used to implement an auxiliary pathway SxA; utilizing only one or a few (less than all) segments results in a higher effective $R_{ON}$ for a segmented FET. An auxiliary switch SxA may also be a separate smaller FET connected in parallel with a corresponding primary switch Sx and configured to have a higher ON resistance $R_{ON}$ than the corresponding primary switch Sx. The selection of the auxiliary switches/pathways SxA in lieu of the primary switches Sx to increase $R_{ON}$ (block 908) may be controlled by suitably programming or configuring the controller 104.

Alternatively, or in addition, the ON resistance $R_{ON}$ of the series-connected charge pump switches may be increased by reducing the FET gate-drive voltage for those switches for a selected duration of time and/or number of switching cycles (which is also a measure of time). The FET gate-drive voltage can be controlled by suitably programming or configuring the controller 104.

The duration of increased $R_{ON}$ for the series-connected charge pump switches may be set by a fixed or variable timing circuit (not shown), or may be determined by one or more factors, including pump capacitor voltages, $V_{IN}$, $V_{OUT}$, and $V_{CX}$ (i.e., the voltages at the stack-nodes $V_{CX}$), and the size of the capacitors (e.g., C1-C4 and/or $C_{OUT}$). For example, referring to FIG. 9, the voltages at the stack-nodes $V_{CX}$ may be compared against respective reference voltages to determine whether the voltages across the pump capacitors Cx are outside desired values throughout startup (block 906) in order to determine when to exit the startup phase with increased $R_{ON}$ for the series-connected charge pump switches (block 908) and operate instead with reduced $R_{ON}$ (block 910). Similar measurements may be made at $V_{IN}$ and $V_{OUT}$ (across $C_{OUT}$).

In addition to temporarily increasing the ON resistance $R_{ON}$, the frequency of charge pump switching (e.g., the frequency of clock waveforms P1 and P2) may be increased for all or part of the duration of increased $R_{ON}$. Thereafter, the frequency of charge pump switching can revert to a normal value for power efficiency. For example, a normal clock frequency for P1 and P2 for many applications may be in the range of about 100 kHz to about 1 MHz. While the $R_{ON}$ of the series-connected charge pump switches is temporarily increased, the clocking frequency may also be increased, for example, by a factor of 2 or more. The increased clock frequency reduces the rate of voltage change at each of the $V_{CX}$ stack-nodes until the problem of possible in-rush current is eliminated or mitigated. The frequency of charge pump switching may be controlled by suitably programming or configuring the controller 104.

In the special case of a single-phase symmetric cascade multiplier like the circuits of FIG. 2 or FIG. 3A, in-rush current and switch overstress at startup can be mitigated by invoking a timing sequence such that the first switching cycle for the included charge pump begins with clock waveform P2 going to a logic "1" instead of a logic "0" to avoid rapidly discharging the pump capacitor closest to $C_{OUT}$ (e.g., pump capacitor C4 in FIG. 3A) in the first switching cycle, especially for Scenario 3 (non-precharged $C_{OUT}$, pre-charged $C_{PUMP}$). This method may be less beneficial with multi-phase charge pump operation or in other startup scenarios.

A benefit of the above techniques is that they may be implemented using only existing control and charge pump circuitry. Further, such techniques may be intelligently applied by measuring the stack-node voltages $V_{CX}$ to determine which startup scenario applies, allowing selection of the best corresponding solution. However, selection and application of such techniques may be done independently of the startup scenario for some applications, if desired.

D. Startup with Decoupling from Output Voltage Source

Figure 10:
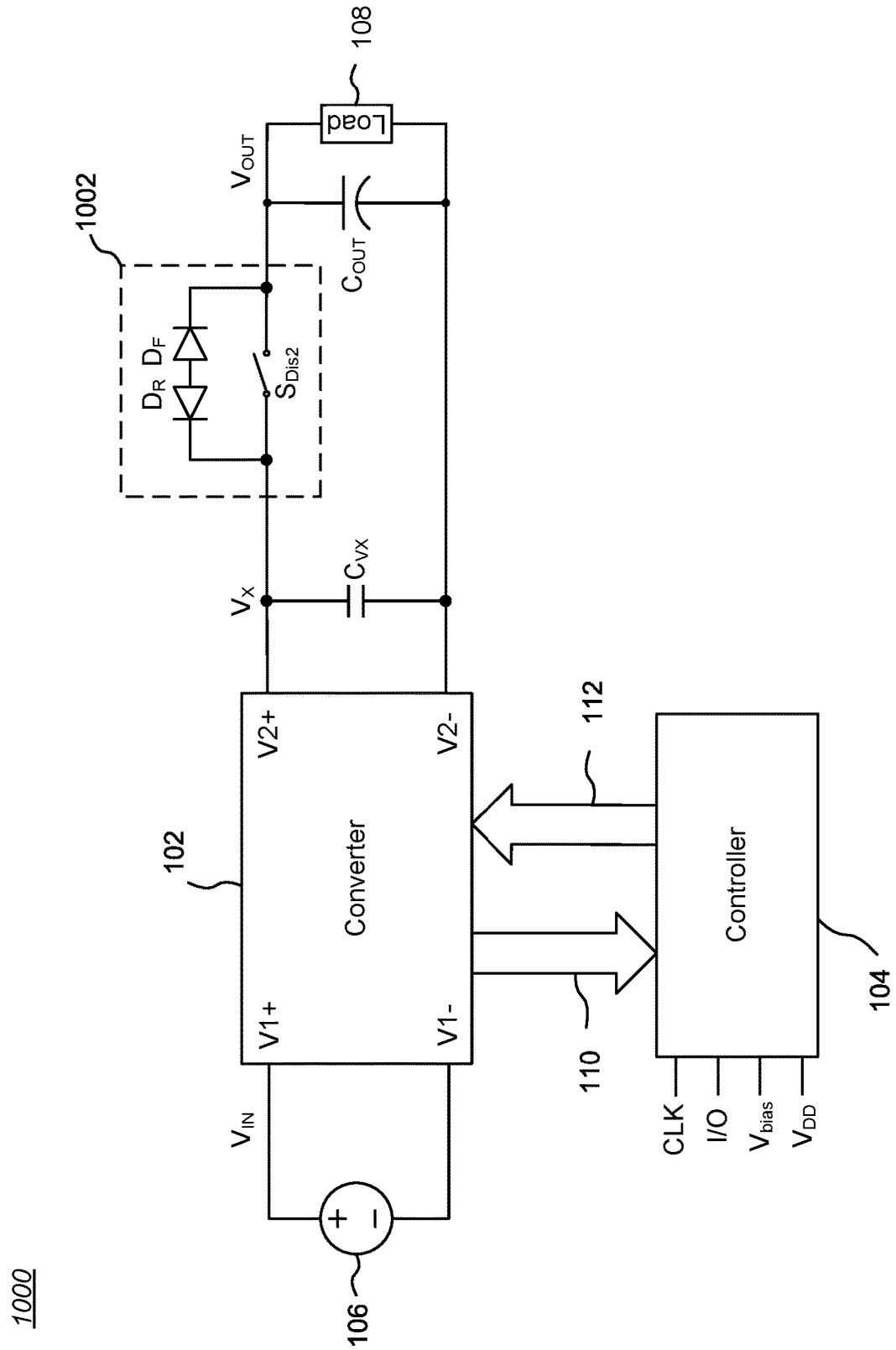
FIG. 10 is a block diagram of a switched-capacitor power converter that can be selectively isolated from $V_{OUT}$.

Another method of robustly starting up a switched-capacitor step-down converter from a variety of startup scenarios is to add a switch between the output of the converter circuit 102 and the voltage $V_{OUT}$ across the output capacitor $C_{OUT}$. This method eliminates the need for rebalancing. For example, FIG. 10 is a block diagram of a switched-capacitor power converter 1000 that can be selectively isolated from the output capacitor $C_{OUT}$ and the output load 108. The basic circuit is similar to the circuit of FIG. 1, with the addition of a switch block 1002 that includes a disconnect switch $S_{Dis2}$.

As with the example shown in FIG. 8, the disconnect switch $S_{Dis2}$ may comprise two separate series-connected FET switches with corresponding body diodes $D_F$ and $D_R$ configured with opposite polarities, to essentially fully isolate the output voltage $V_{OUT}$ from terminal V2+ of the converter circuit 102 when the disconnect switch $S_{Dis2}$ is open. Alternatively, the disconnect switch $S_{Dis2}$ may comprise a single transistor that provides suitable bidirectional isolation (e.g., transistors based on GaAs or GaN or SOI technologies), or any other type of switch that provides suitable bidirectional isolation. Depending on the relative values of the Vx and $V_{OUT}$ voltages, the disconnect switch $S_{Dis2}$ may also be a single transistor with a switched body-bias capability. Control signals (not shown) from the controller 104 to the switch block 1002 control the open or closed state of the disconnect switch $S_{Dis2}$.

Optionally, an intermediate capacitor $C_{VX}$ may be coupled across the output terminals V2+, V2− of the converter circuit 102 between the switch block 1002 and the converter circuit 102, for example, if noise/EMI needs to be filtered or if there exists circuitry powered off node Vx. The voltage across the intermediate capacitor $C_{VX}$ is Vx, and the capacitance of the intermediate capacitor $C_{VX}$ generally would be set to be much smaller than the capacitance of the output capacitor $C_{OUT}$ and smaller than the capacitance of each charge pump capacitor Cx (e.g., $C_{VX}$ may equal about 10% of each charge pump capacitor).

During shutdown and startup, the disconnect switch $S_{Dis2}$ is set to an open state to disconnect the converter circuit 102 from the output capacitor $C_{OUT}$ and the output load 108. In this example, the shutdown configuration allows the discharge of the stack-nodes $V_{CX}$ and hence of the charge pump capacitors Cx without discharging the output capacitor $C_{OUT}$ and thus without affecting the load 108. The discharge of the stack-nodes $V_{CX}$ may be implemented using auxiliary switches/pathways SxA that connect from each stack-node $V_{CX}$ and Vx to ground. With the stack-nodes $V_{CX}$, Vx discharged and in light of the small size of the intermediate capacitor $C_{VX}$, the switched-capacitor power converter 1000 shown in FIG. 10 essentially always starts up in Scenario 1 (non-precharged $C_{VX}$, non-precharged $C_{PUMP}$). Accordingly, during a switching period of the startup state, the converter circuit 102 may be switched in normal fashion (i.e., clock waveforms P1 and P2 are applied) until the charge pump capacitors Cx and the intermediate capacitor $C_{VX}$ are charged to desired voltages (fractions of the input voltage $V_{IN}$). Once the charge pump capacitors Cx are at a sufficient voltage level (e.g., within ±20% of a target voltage), then the disconnect switch $S_{Dis2}$ may be closed so as to reconnect the output capacitor $C_{OUT}$ and the output load 108 across the terminals V2+, V2− of the converter circuit 102 for steady-state operation.

In many applications, it may be useful to close a disconnect switch $S_{Dis2}$ in a gradual manner to prevent a large current in-rush or out-rush through the switches Sx of the converter circuit 102 while the voltages across the intermediate capacitor $C_{VX}$ and the output capacitor $C_{OUT}$ equalize. Gradual closing of the disconnect switch $S_{Dis2}$ may be time-based or may be a function of measured current through the disconnect switch $S_{Dis2}$.

Figure 11:
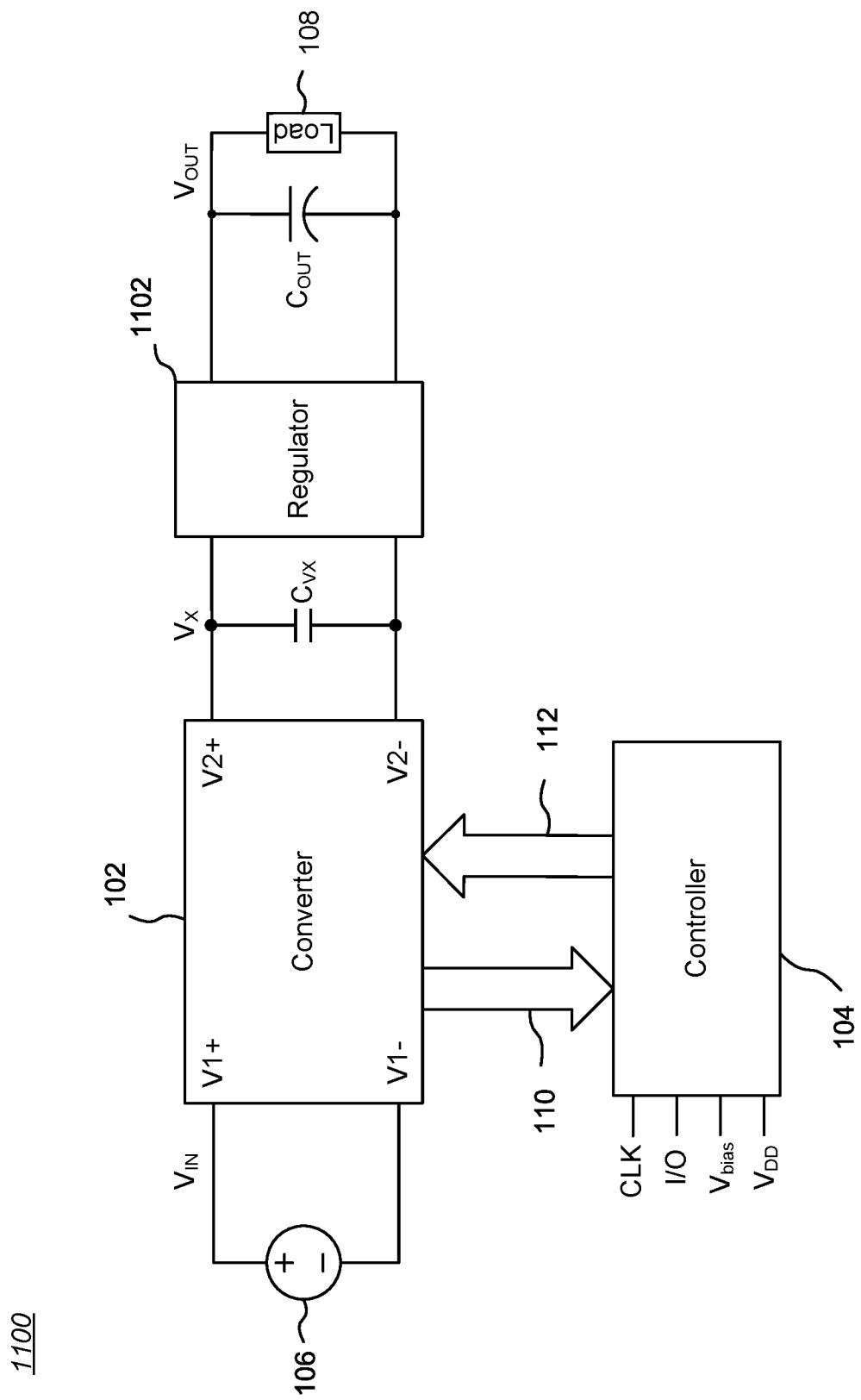
FIG. 11 is a block diagram of a switched-capacitor power converter that is isolated from the output voltage $V_{OUT}$ using a voltage regulator rather than a disconnect switch.

FIG. 11 is a block diagram of a switched-capacitor power converter 1100 that is isolated from the output voltage $V_{OUT}$ using a voltage regulator 1102 rather than a disconnect switch $S_{Dis2}$. An intermediate capacitor $C_{VX}$ is coupled across the terminals V2+, V2− of the converter circuit 102 between the voltage regulator 1102 and the converter circuit 102. As is known in the art, a voltage regulator is a system designed to automatically maintain a constant voltage level, and commonly comprises an inductor-based switching regulator. A control circuit enables or disables the voltage regulator 1102; the control circuit may be part of the controller 104, or may be internal to the voltage regulator 1102, or may be a separate circuit (not shown).

In a first startup example, the voltage regulator 1102 is disabled initially, isolating the output voltage $V_{OUT}$ from terminal V2+ of the converter circuit 102. The converter circuit 102 may then be switched in normal fashion (i.e., clock waveforms P1 and P2 are applied) until the charge pump capacitors Cx reach desired voltages (fractions of the input voltage $V_{IN}$). Thereafter, the voltage regulator 1102 is enabled and automatically handles any voltage difference between Vx and $V_{OUT}$, in known fashion, so as to set and regulate $V_{OUT}$ to a desired level.

In a second startup example, the voltage regulator 1102 is enabled at the same that converter circuit 102 begins switching according to clock waveforms P1 and P2. The voltage regulator 1102 also automatically controls and regulates $V_{OUT}$ while handling any voltage difference between Vx and $V_{OUT}$, in known fashion.

Figure 12:
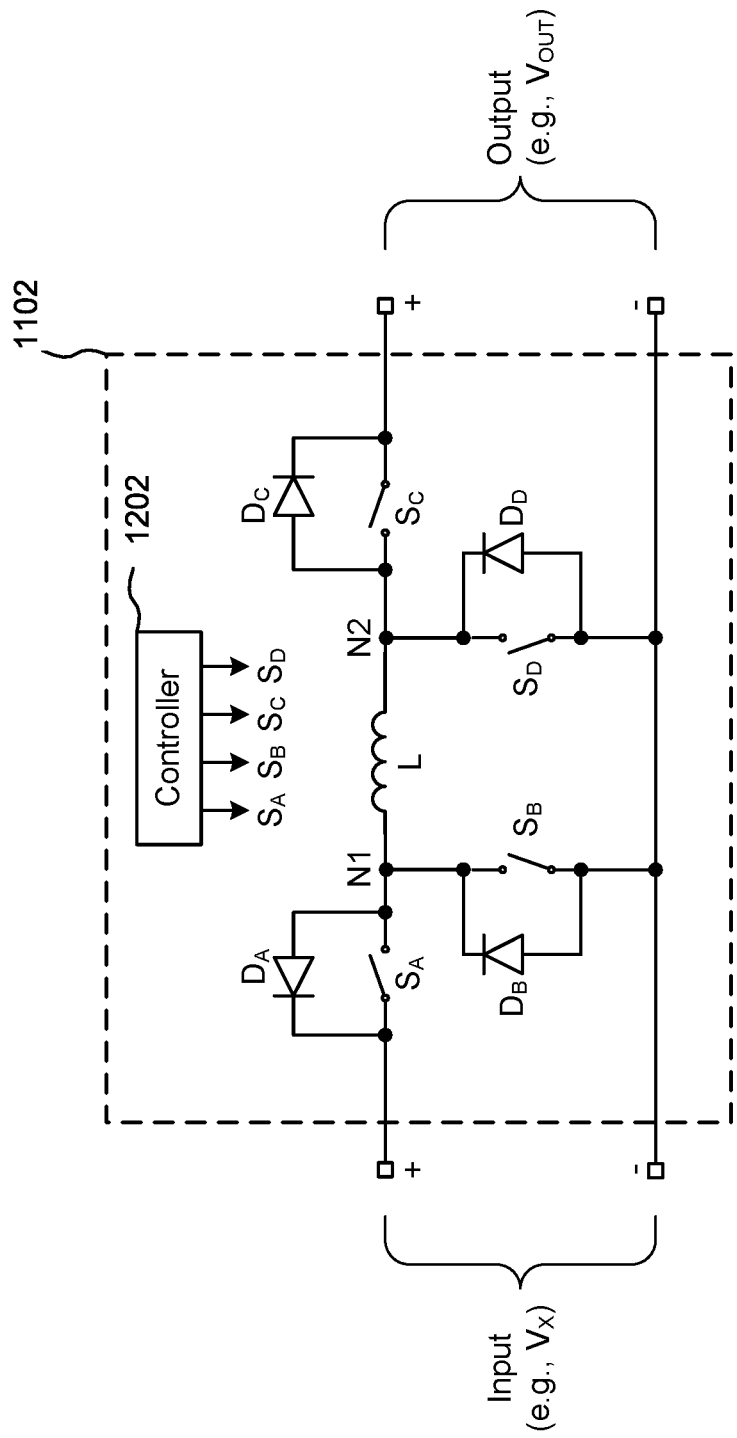
FIG. 12 is a more detailed block diagram of one embodiment of a voltage regulator that may be used in the circuit shown in FIG. 11.

FIG. 12 is a more detailed block diagram of one embodiment of a voltage regulator 1102 that may be used in the circuit shown in FIG. 11. The voltage regulator 1102 receives an input voltage across positive and negative input terminals and produces an output voltage across positive and negative output terminals. Voltage regulation across the positive and negative output terminals is accomplished by opening and closing the switches $S_A$, $S_B$, $S_C$, $S_D$ (or a subset of these) around an inductor L in known fashion.

In the illustrated example, switch $S_A$ is series-connected between the positive input terminal and an inductor L, and switch $S_C$ is series-connected between the positive output terminal and the inductor L. Switch $S_B$ is coupled in a shunt configuration to a node N1 between switch $S_A$ and the inductor L. Switch $S_D$ is coupled in a shunt configuration to a node N2 between switch $S_C$ and the inductor L. When fabricated as MOSFET transistors, switches $S_A$-$S_D$ have respective inherent body-diodes $D_A$-$D_D$ as shown in FIG. 12.

A controller 1202, which may be internal to or external to the voltage regulator 1102, controls the operation of each of the switches $S_A$-$S_D$ (control line connections to the switches $S_A$-$S_D$ are omitted to avoid clutter). In particular, the controller 1202 may provide non-overlapping clock phases p1, p2 to the switches $S_A$-$S_D$ (clock phases p1, p2 may have a different phasing than the two-phase clock waveforms P1 and P2 described previously for the converter circuit 102), although additional clock phases to the switches $S_A$-$S_D$ are also possible. The voltage regulator 1102 may be effectively disabled by opening at least switches $S_A$ and $S_C$.

In various embodiments, the voltage regulator 1102 may include a subset of or all of the four switches $S_A$-$S_D$ shown, implementing either a buck voltage converter (just switches $S_A$, $S_B$), a boost voltage converter (just switches $S_C$, $S_D$), or a non-inverting buck-boost voltage converter (all of switches $S_A$-$S_D$). For purposes of generality, all of the switches $S_A$-$S_D$ will be considered present, although some may be forced closed (and thus function as a short circuit) for some configurations while others may be forced open for other configurations. However, it should be understood that embodiments of the voltage regulator 1102 may actually omit some of the switches $S_A$-$S_D$ if only specific functionality is required.

In the illustrated embodiment, the controller 1202 may configure the voltage regulator 1102 to operate in different modes of operation (however, in general, the voltage regulator does not have to be reconfigurable).

For example, the voltage regulator 1102 may be configured to operate in a buck mode by closing switch $S_C$ while opening $S_D$ during every switching cycle. Switch $S_A$ will transition between ON and OFF states based on the duty cycle or ON-time of one of the clock phases (e.g., p1) as set by the controller 1202. Switch $S_B$ will transition between OFF and ON states that are complementary to the ON and OFF states of switch $S_A$ based on the other of the clock phases (e.g., p2). Non-reconfigurable implementations of the voltage regulator 1102 omit switch $S_D$ and replace switch $S_C$ with a direct connection to the positive output terminal, thereby reducing the component count and required integrated circuit area.

As another example, the voltage regulator 1102 may be configured to operate in a boost mode by closing switch $S_A$ while opening switch $S_B$ during every switching cycle. Switch $S_D$ will transition between ON and OFF states based on the duty cycle or ON-time set by the controller 1202. Switch $S_C$ will transition between OFF and ON states that are complementary to the ON and OFF states of switch $S_D$. Non-reconfigurable implementations of the voltage regulator 1102 omit switch $S_B$ and replace switch $S_A$ with a direct connection to the positive input terminal, thereby reducing the component count and required integrated circuit area.

As yet another example, the voltage regulator 1102 may be configured to operate in a non-inverting buck-boost mode. In this type of configuration, all of the switches $S_A$-$S_D$ transition between ON and OFF states, some at the same time and some at different times, during specific clock phases set by the controller 1202.

In all configurations of the voltage regulator 1102, the controller 1202 sequences transitions of all the switches $S_A$-$S_D$ in such a way as to incorporate any necessary clock phase or dead-time needed during operation of the switches $S_A$-$S_D$ according to buck mode, boost mode, or buck-boost mode, in known fashion.

Based on information indicative of the operational state of the switched-capacitor power converter 1100 in FIG. 11, the controller 1202 sends control signals to control the duty cycle of the switches $S_A$-$S_D$ and to therefore regulate the output voltage of the voltage regulator 1102. As such, it defines a feedback loop using some or all of the signals received, such as the signals on the input-signal path 110, the clock signal CLK, and/or the input/output signals I/O to the controller 104.

Benefits

The methods and devices described herein are designed so that a switched-capacitor power converter can robustly startup from a variety of startup scenarios involving the initial voltage conditions of both the charge pump capacitors Cx and the output capacitor $C_{OUT}$, and to do so in a reasonably quick startup time.

It should clear to one of ordinary skill in the art that a number of the above solutions may be used in conjunction. For example, the circuits and methods described herein for prevention of charge pump capacitor full discharge during shutdown can be combined with the circuits and methods described herein for rebalancing charge pump capacitors before startup.

Methods

Another aspect of the invention includes methods of preventing charge pump capacitor full discharge during a shutdown state of a switched-capacitor power converter. For example, FIG. 13 is a process flow chart 1300 showing a first method of preventing charge pump capacitor full discharge during a shutdown state of a switched-capacitor power converter having a plurality of charge pump capacitors and a plurality of low-side phase switches each coupled to at least one respective charge pump capacitor. The method includes keeping the plurality of low-side phase switches closed during the shutdown state (Block 1302).

FIG. 14 is a process flow chart 1400 showing a second method of preventing charge pump capacitor full discharge and/or to minimize in-rush current in a switched-capacitor power converter having a plurality of charge pump capacitors and a plurality of low-side phase switches each coupled to at least one respective charge pump capacitor. The method includes coupling a respective pulldown device in parallel with one or more of the plurality of low-side phase switches (Block 1402), and configuring each pulldown device to prevent full discharge of the charge pump capacitors and/or to minimize in-rush current during at least one selected state of the power converter (Block 1404).

Additional aspects of the above method may include one or more of the following: wherein at least one of the plurality of pulldown devices is a resistor; wherein at least one of the plurality of pulldown devices is a transistor-based device, and further including configuring the transistor-based device to be at least partially conductive during at least one selected state of the power converter, and essentially non-conductive in at least one other state of the power converter; and/or wherein at least one of the plurality of pulldown devices is a switched pulldown device including a transistor-based switch in series with a resistor or a transistor-based current sink.

Another aspect of the invention includes startup methods of rebalancing a plurality of charge pump capacitors in a switched-capacitor power converter and/or limiting in-rush current to such charge pump capacitors, and/or preventing over-stress of the charge pump switches.

As another example, FIG. 15 is a process flow chart 1500 showing a first startup method of limiting in-rush current and/or avoiding switch over-stress within a switched-capacitor power converter having a plurality of charge pump capacitors each connected between corresponding adjacent pairs of series-connected switches Sx. The method includes increasing the ON resistance $R_{ON}$ of the series-connected switches Sx for a first selected duration of time and/or a first number of switching cycles and/or until a first measured voltage across any of the plurality of charge pump capacitors is within a corresponding desired value range (Block 1502).

As still another example, FIG. 16 is a process flow chart 1600 showing a second startup method of limiting in-rush current and/or avoiding switch over-stress within a switched-capacitor power converter having a plurality of charge pump capacitors, wherein the power converter is configured to be coupled between a first voltage source and a second voltage source. The method includes: in a startup mode of operation, disconnecting the second voltage source from the power converter and operating the power converter in a step-down mode of voltage conversion until the plurality of charge pump capacitors are charged to a desired voltage from the first voltage source (Block 1602); and thereafter connecting the second voltage source to the power converter and enabling operation of the power converter in a step-down mode of voltage conversion (Block 1604).

As yet another example, FIG. 17 is a process flow chart 1700 showing a third startup method of limiting in-rush current and/or avoiding switch over-stress within a switched-capacitor power converter having a plurality of charge pump capacitors, wherein the power converter is configured to be coupled between a first voltage source and a second voltage source. The method includes: in a startup mode of operation, disconnecting the first voltage source from the power converter and operating the power converter in a reversed, step-up mode of voltage conversion until the plurality of charge pump capacitors are charged to a desired voltage from the second voltage source (Block 1702); and thereafter connecting the first voltage source to the power converter and enabling operation of the power converter in a step-down mode of voltage conversion (Block 1704).

As another example, FIG. 18 is a process flow chart 1800 showing a first startup method of rebalancing a plurality of charge pump capacitors in a switched-capacitor power converter. The method includes: connecting pairs of the charge pump capacitors between corresponding adjacent pairs of n series-connected switches Sx, each series-connected switch Sx having a corresponding auxiliary switch/pathway SxA (Block 1802); coupling first and second high-side phase switches to at least one respective charge pump capacitor (Block 1804); coupling first and second low-side phase switches to at least one respective charge pump capacitor, each low-side phase switch having a corresponding auxiliary switch/pathway (Block 1806); limiting in-rush current to the plurality of charge pump capacitors by preventing full discharge of the charge pump capacitors during at least one selected state of the power converter by keeping the auxiliary switches/pathways of the first and second low-side phase switches closed during a first period of a time while opening the first and second high-side phase switches and the n series-connected switches Sx and corresponding auxiliary switches/pathways (Block 1808); and balancing voltage among the plurality of charge pump capacitors after the first period of a time by closing the first and second low-side phase switches, optionally opening the auxiliary switches/pathways of the first and second low-side phase switches, keeping the first and second high-side phase switches open, keeping the n series-connected switches Sx open, closing the auxiliary switches/pathways of m of the n series-connected switches Sx where m is less than n, and then progressively opening one or more of the m auxiliary switches/pathways of the n series-connected switches Sx over one or more time periods (Block 1810).

Additional aspects of the above method may include one or more of the following: progressively opening at least some of the m auxiliary switches/pathways of the n series-connected switches Sx in reverse order; or progressively opening at least some of the m auxiliary switches/pathways of the n series-connected switches Sx in forward order.

Additional aspects of the above method may include one or more of the following: wherein at least some of the plurality of series-connected switches Sx includes a corresponding auxiliary switch/pathway SxA having a higher ON resistance $R_{ON}$ than the corresponding switch Sx, further including increasing the ON resistance $R_{ON}$ of the series-connected switches Sx by using the auxiliary switches/pathways SxA in lieu of the corresponding switches Sx; wherein the plurality of series-connected switches Sx each comprise a field-effect transistor (FET) having a gate that controls the ON resistance $R_{ON}$ of the FET, each FET configured to have its gate coupled to a source of gate drive voltage, further including increasing the ON resistance $R_{ON}$ of the series-connected switches Sx by reducing the gate drive voltage to the respective gates of the FETs; and/or increasing the frequency of switching of the switches Sx for a second selected duration of time and/or a second number of switching cycles and/or until a second measured voltage across any of the plurality of charge pump capacitors is within a corresponding desired value range.

FIG. 19 is a process flow chart 1900 showing a second method of rebalancing a plurality of charge pump capacitors in a switched-capacitor power converter, wherein each charge pump capacitor is connected between corresponding adjacent pairs of series-connected switches Sx at a stack-node. The method includes: sensing an output voltage of the converter and generating a signal indicative of the output voltage (Block 1902); and charging or discharging each charge pump capacitor towards a corresponding multiple of the output voltage of the converter as a function of the generated signal indicative of the output voltage (Block 1904).

Additional aspects of the above method may include one or more of the following: selectively connecting the plurality of charge pump capacitors to circuit ground through a resistive path during a pre-switching period; selectively connecting the plurality of charge pump capacitors to circuit ground after a pre-switching period; generating a reference current as a function of the generated signal indicative of the output voltage, and providing to each stack-node a corresponding multiple of the output voltage of the converter in response to the reference current; sensing an output voltage of the converter includes coupling an amplifier circuit to the output voltage of the converter, further including generating a reference current as a function of the generated signal indicative of the output voltage, and providing an offset current to the comparator (or inserting an offset within the comparator) when the output voltage is insufficient to generate an adequate value for the reference current; wherein charging or discharging each charge pump capacitor can occur through a plurality of rebalance drivers, each rebalance driver coupled to a corresponding stack-node and to a voltage derived from the generated signal indicative of the output voltage and configured to provide a charge path to the corresponding stack-node and/or a discharge path from the corresponding stack-node to one of the output voltage of the converter or circuit ground.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or modules for ease of handling, manufacture, and/or improved performance. In particular, IC embodiments of this invention are often used in modules in which one or more of such ICs are combined with other circuit blocks (e.g., filters, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A switched-capacitor power converter including:
   (a) a charge pump having a plurality of charge pump capacitors;
   (b) a plurality of low-side phase switches each coupled to at least one respective charge pump capacitor; and
   (c) a controller coupled to the plurality of low-side phase switches;
   wherein the controller is configured to prevent full discharge of the charge pump capacitors during a shutdown state of the converter by keeping the plurality of low-side phase switches closed during the shutdown state.

2. A switched-capacitor power converter including:
   (a) a charge pump having a plurality of charge pump capacitors;
   (b) a plurality of low-side phase switches each coupled to at least one respective charge pump capacitor; and
   (c) a plurality of pulldown devices coupled in parallel with respective ones of the plurality of low-side phase switches;
   wherein the plurality of pulldown devices are configured to prevent full discharge of the charge pump capacitors during a shutdown state of the power converter.

3. The invention of claim 2, wherein at least one of the first and second pulldown devices is a resistor.

4. The invention of claim 2, wherein at least one of the first and second pulldown devices is a transistor-based device configured to be at least partially conductive during the shutdown state of the power converter, and essentially non-conductive at other times.

5. The invention of claim 2, wherein at least one of the first and second pulldown devices is a switched pulldown device including a transistor-based switch in series with a resistor.

6. The invention of claim 2, wherein at least one of the first and second pulldown devices includes a current sink.

7. A switched-capacitor power converter including:
   (a) first and second input terminals, and first and second output terminals;
   (b) a plurality of series-connected switches S1-Sn connected between the first input terminal and the first output terminal, each series-connected switch having a corresponding auxiliary switch/pathway SxA;
   (c) a plurality of charge pump capacitors, each connected between corresponding adjacent pairs of the plurality of series-connected switches;
   (d) first and second high-side phase switches each coupled between the first output terminal and to at least one respective charge pump capacitor, each high-side phase switch optionally having a corresponding auxiliary switch/pathway;
   (e) first and second low-side phase switches each coupled between the second output terminal and to at least one respective charge pump capacitor, each low-side phase switch having a corresponding auxiliary switch/pathway;
   (f) a controller coupled to the plurality of series-connected switches, the first and second high-side phase switches, the first and second low-side phase switches, and the auxiliary switches/pathways;
   wherein the controller is configured to prevent full discharge of the charge pump capacitors during a first period of a time of a startup state of the power converter by keeping the auxiliary switches/pathways of the first and second low-side phase switches closed during the first period of a time while opening the first and second high-side phase switches and corresponding auxiliary switches/pathways and the plurality of series-connected switches S1-Sn and corresponding auxiliary switches/pathways; and
   wherein the controller is configured to balance voltage among the plurality of charge pump capacitors after the first period of a time by closing the first and second low-side phase switches, optionally opening the auxiliary switches/pathways of the first and second low-side phase switches, keeping the first and second high-side phase switches open, keeping the plurality of series-connected switches S1-Sn open, closing the auxiliary switches/pathways of m of the series-connected switches S1-Sn where m is less than n, and then progressively opening one or more of the m auxiliary switches/pathways of the series-connected switches S1-Sn over one or more of time periods.

8. The invention of claim 7, wherein at least some of the m auxiliary switches/pathways of the series-connected switches S1-Sn are progressively opened in reverse order relative to the first input terminal.

9. The invention of claim 7, wherein at least some of the m auxiliary switches/pathways of the series-connected switches S1-Sn are progressively opened in forward order relative to the first input terminal.

10. The invention of claim 7, wherein at least some of the m auxiliary switches/pathways of the series-connected switches S1-Sn are opened as a function of measured stack-node voltage.

11. A circuit configured to rebalance charge pump capacitors in a switched-capacitor power converter having (1) a plurality of series-connected switches connected between a first input terminal and a first output terminal and (2) a plurality of charge pump capacitors, each charge pump capacitor connected to a stack-node between corresponding adjacent pairs of the plurality of series-connected switches, the circuit including:
  (a) a voltage sensing circuit coupled to an output voltage of the power converter and configured to generate a signal indicative of the output voltage; and
  (b) a balance circuit coupled to the voltage sensing circuit and to each stack-node, and configured to charge or discharge each charge pump capacitor towards a multiple of the output voltage of the power converter as a function of the generated signal indicative of the output voltage.

12. The invention of claim 11, further including a plurality of pulldown circuits, each coupled to a corresponding charge pump capacitor and configured to selectively connect the corresponding charge pump capacitor to circuit ground through a resistive path during a pre-switching period.

13. The invention of claim 11, wherein the voltage sensing circuit generates a reference current as a function of the generated signal indicative of the output voltage, and wherein the balance circuit further includes a current mirror coupled to the reference current and having at least one mirror leg coupled to a corresponding stack-node and configured to provide to the corresponding stack-node a corresponding steady-state multiple of the output voltage of the power converter in response to the reference current.

14. The invention of claim 11, wherein the voltage sensing circuit generates a reference current as a function of the generated signal indicative of the output voltage, and further including an offset circuit coupled to the voltage sensing circuit and configured to provide an offset current to the voltage sensing circuit when the output voltage is insufficient to generate an adequate value for the reference current.

15. The invention of claim 11, wherein the voltage sensing circuit generates a reference current as a function of the generated signal indicative of the output voltage, and wherein the balance circuit further includes:
  (a) a current mirror coupled to the reference current and having a mirror leg configured to provide a plurality of voltages in response to the reference current, each voltage being a steady-state multiple of the output voltage of the power converter; and
  (b) a plurality of rebalance drivers, each coupled to a corresponding stack-node and to a voltage derived from the generated signal indicative of the output voltage of the power converter, and each coupled to and controlled by a corresponding voltage provided by the mirror leg, for selectively providing a charge path to the corresponding stack-node proportionate to the corresponding voltage provided by the mirror leg and/or a discharge path from the corresponding stack-node to one of the output voltage of the power converter or circuit ground.

* * * * *